United States Patent
Tomura et al.

[11] Patent Number: 5,998,093
[45] Date of Patent: *Dec. 7, 1999

[54] OPTICAL INFORMATION RECORDING MEDIUM

[75] Inventors: Tatsuya Tomura; Tsutomu Satoh; Noboru Sasa; Yasunobu Ueno; Yasuhiro Higashi, all of Yokohama, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/790,433

[22] Filed: Jan. 29, 1997

[30] Foreign Application Priority Data

Jan. 29, 1996 [JP] Japan .................................. 8-034291
Jun. 18, 1996 [JP] Japan .................................. 8-177545

[51] Int. Cl.$^6$ ........................................................ G11B 7/24
[52] U.S. Cl. .................. 430/270.16; 430/945; 428/64.8
[58] Field of Search ............................... 430/270.16, 945; 369/284, 288; 428/64.8

[56] References Cited

U.S. PATENT DOCUMENTS

| | | |
|---|---|---|
| 3,509,146 | 4/1970 | Weinberger et al. ............... 540/121 |
| 4,626,496 | 12/1986 | Sato . |
| 4,656,121 | 4/1987 | Sato et al. . |
| 4,714,667 | 12/1987 | Sato et al. . |
| 4,735,839 | 4/1988 | Sato et al. . |
| 4,737,444 | 4/1988 | Satoh et al. . |
| 4,758,499 | 7/1988 | Abe et al. . |
| 4,767,693 | 8/1988 | Oba et al. . |
| 4,814,256 | 3/1989 | Aldag et al. ..................... 430/270.16 |
| 4,891,305 | 1/1990 | Oba et al. . |
| 5,002,812 | 3/1991 | Umehara et al. . |
| 5,028,467 | 7/1991 | Maruyama et al. . |
| 5,085,909 | 2/1992 | Satoh et al. . |
| 5,149,819 | 9/1992 | Satoh et al. . |
| 5,256,794 | 10/1993 | Satoh et al. . |
| 5,260,165 | 11/1993 | Satou et al. . |
| 5,510,229 | 4/1996 | Satoh et al. . |

FOREIGN PATENT DOCUMENTS

| | | |
|---|---|---|
| 0 252 360 | 1/1988 | European Pat. Off. . |
| 325 742 | 8/1989 | European Pat. Off. . |
| 41 26 461 | 2/1993 | Germany . |
| 63-312889 | 12/1988 | Japan . |
| 7-268227 | 10/1995 | Japan . |

OTHER PUBLICATIONS

Patent Abstracts of Japan, vol. 096, No. 002, Feb. 29, 1996, JP 07 268227, Oct. 17, 1995.
Paten Abstracts of Japan, vol. 013, No. 153 (M–813), Apr. 13, 1989, JP 63 312889, Dec. 12, 1988.

Abstract of DE 41 26 461 (Feb. 1993), Hoppe.

Primary Examiner—John A. McPherson
Attorney, Agent, or Firm—Oblon, Spivak, McClelland, Maier & Neustadt, P.C.

[57] ABSTRACT

An optical information recording medium includes a substrate, and a recording layer formed on the substrate, the recording layer containing at least one compound selected from the group consisting of a compound represented by formula (I):

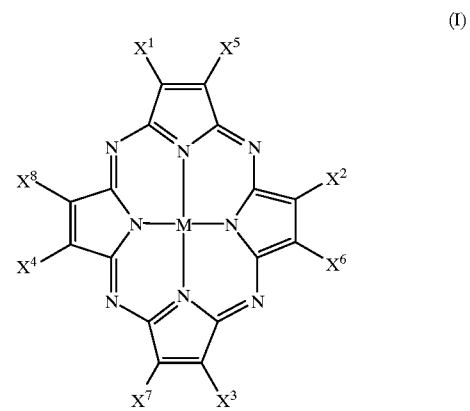

and a compound represented by formula (II):

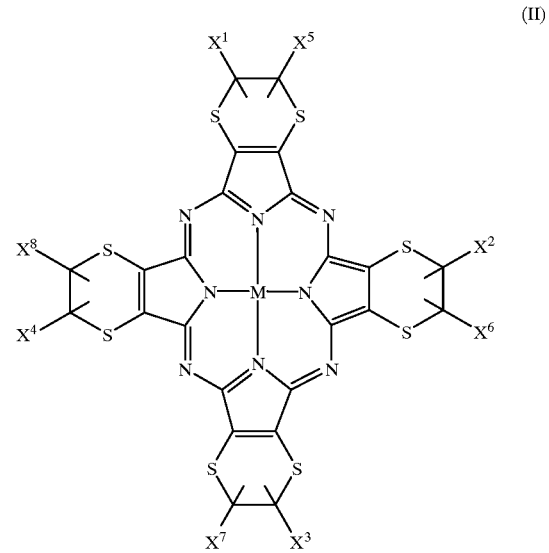

28 Claims, 3 Drawing Sheets

F I G. 3(a)
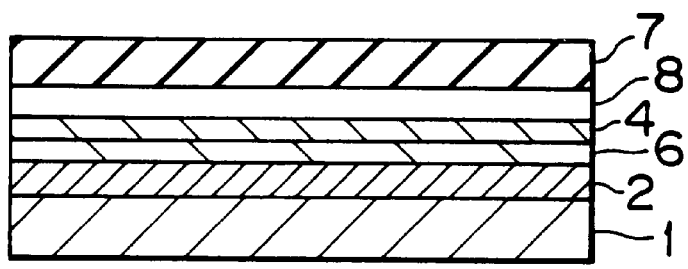
F I G. 3(b)
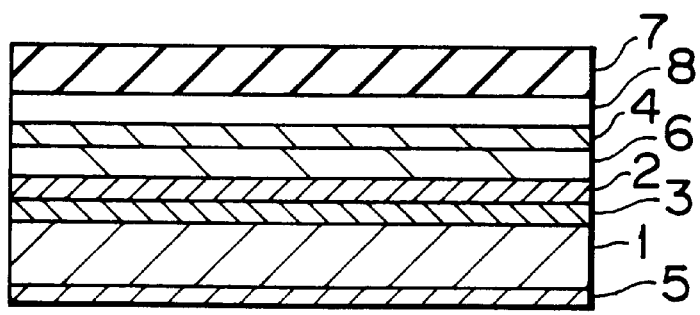

OPTICAL INFORMATION RECORDING MEDIUM

BACKGROUND OF THE INVENTION

1. Field of the Invention

The present invention relates to an optical information recording medium, in particular to an optical information recording medium of a write once read many type, in which the recording and reproduction of information are carried out by changing the optical characteristics of a recording material for the optical information recording medium, such as transmittance and reflectivity, with the application of an optical beam thereto.

2. Discussion of Background

The wavelength of a laser used for a currently employed disk system of a write once read many type, which may be referred to as WORM disk system is in the range of 770 nm to 790 nm, and a recording medium for the disk system is constructed in such a manner that recording and reproduction can be performed in the above-mentioned wavelength range.

Sooner or later, it will become inevitable that the capacity of such recording media has to be significantly increased in accordance with the amount of information to be handled. It will also become inevitable that the wavelength of the laser beam used for the recording and reproduction has to be shortened.

Currently many types of optical disks of the write once and read many type for recording and reproduction of data, using cyanine dyes or phthalocyanine dyes as recording materials (hereinafter referred to as WORM optical disks), have been proposed.

For example, WORM optical disks using as a recording material a cyanine dye are disclosed in Japanese Laid-Open Patent Applications 57-82093, 58-56892, 58-112790, 58-114989, 59-85791, 60-83236, 60-89842, and 61-25886. Furthermore, WORM optical disks using as a recording material a phthalocyanine dye are disclosed in Japanese Laid-Open Patent Applications 61-150243, 61-177287, 61-154888, 61-246091, 62-39286, 63-37791, and 63-39888. However, there has not yet been developed a recording material which has high light resistance and excellent preservation stability, and by which recording and reproduction can be performed by an optical pick-up using a laser with a wavelength of 700 nm or less.

Currently employed CD-R (Recordable) disk systems are also constructed in such a manner that recording and reproduction can be performed by a laser beam with a wavelength in the range of 770 nm to 790 nm.

As in the case of the above-mentioned WORM disk system, it will become inevitable that the capacity of the recording media has to be significantly increased in accordance with the amount of information to be handled, and that the wavelength of the laser beam used for the recording and reproduction also has to be shortened.

In CDs and CD-ROMs which are currently employed, Al is coated on the concave and convex portions of the substrate therefor and the wavelength-dependence of the reflectivity of Al is so small that even if the wavelength of the laser beam used therefor is shortened in the future, reproduction of information recorded in such CDs and CD-ROMs is possible.

However, the recording layer of the currently employed CD-R, which uses therein a dye with a maximum absorption wavelength in the range of 680 nm to 750 nm, is designed so as to exhibit a maximum reflectivity when a laser beam with a wavelength of 770 nm to 750 nm is applied thereto, with the optical characteristics and constants and the thickness and structure of the recording layer taken into consideration.

Therefore, when a laser beam with a wavelength of 700 nm or less is applied thereto, the reflectivity exhibited by the recording layer is extremely small, so that the currently employed CD-R cannot cope with the shortening of the wavelength of the employed laser beam in the future. As a result, it will be highly possible that the information recorded by the currently employed CD-R system cannot be reproduced by such a future system.

Many recording materials, for example, cyanine dye/metal reflection layer, phthalocyanine dye/metal reflection layer, and azo metal chelate dye/metal reflection layer, have been proposed for use in the conventional CD-R systems.

More specifically, CD-R systems using as a recording material in the form of a cyanine dye/metal reflection layer are proposed in Japanese Laid-Open Patent Applications 1-159842, 2-42652, 2-13656, and 2-168446; CD-R systems using a phthalocyane dye as a recording material are proposed in Japanese Laid-Open Patent Applications 1-176585, 3-215466, 4-113886, 4-226390, 5-1272, 5-171052, 5-116456, 5-69860 and 5-139044; and CD-R systems using an azo metal chelate dye are proposed in Japanese Laid-Open Patent Applications 4-46186, 4-141489, 4-361088, and 5-279580.

However, there have not yet been proposed a CD-R system which solves the above-mentioned problems of the conventional CD-R systems.

SUMMARY OF THE INVENTION

It is therefore a first object of the present invention to provide an optical information recording medium which has high light resistance and excellent preservability and can be used in a high density optical disk system which uses a semiconductor laser beam with a shorter wavelength than that of a laser beam employed in the above-mentioned conventional optical information recording disk systems.

Another object of the present invention is to provide a CD-R recording medium which can be employed, not only for the current CD-R disk system, but also for a high density disk system for the next generation.

The above objects of the present invention can be achieved by an optical information recording medium comprising a substrate and a recording layer formed on the substrate, the recording layer comprising at least one compound selected from the group consisting of a compound represented by formula (I):

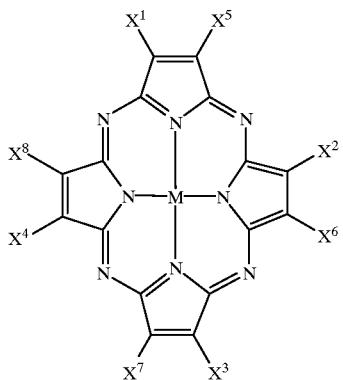

(I)

and a compound represented by formula (II):

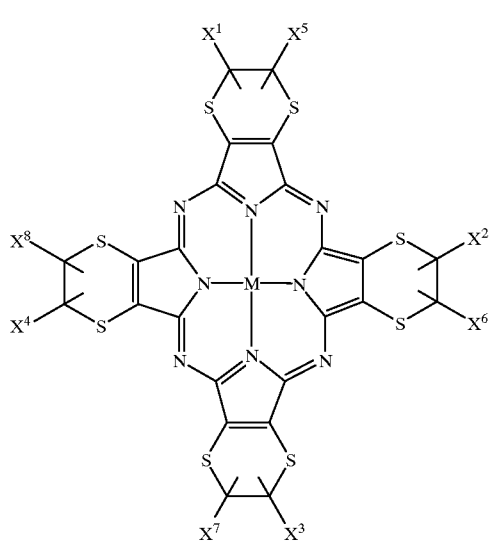

(II)

wherein:

M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an unsubstituted or substituted aryl group, an unsubstituted or substituted alkoxyl group, an unsubstituted or substituted aryloxy group, —$(OPR^1R^2)_p$, —$(OPOR^3R^4)_p$, —$(OSiR^5R^6R^7)_p$, —$(OCOR^8)_p$, —$(OR^9)_p$, —$(OCOCOOR^{10})_p$, —$(OCOCOR^{11})_p$ or —$(OCONR^{12}R^{13})_p$ in which $R^1$ to $R^{13}$ are each independently a hydrogen atom, an unsubstituted or substituted monovalent aliphatic hydrocarbon group, or an unsubstituted or substituted monovalent aromatic hydrocarbon group, and p is an integer of 0 to 2, and $X^1$ to $X^8$ are each independently a hydrogen atom, a halogen atom, a cyano group, an unsubstituted or substituted straight-chain or branched alkyl group, an unsubstituted or substituted alkoxyl group, a carboxylic acid ester group, an unsubstituted or substituted aryl group, an unsubstituted or substituted aryloxy group, an unsubstituted or substituted alkylthio group, an unsubstituted or substituted arylthio group, an unsubstituted or substituted benzyl group, an unsubstituted or substituted benzyloxy group, an unsubstituted or substituted benzylthio group or a heterocyclic group.

In the above formula (I), it is preferable that $X^1$ to $X^4$ be each independently a hydrogen atom or an unsubstituted or substituted straight-chain or branched alkyl group, and that $X^5$ to $X^8$ be each independently a hydrogen atom, an unsubstituted or substituted alkoxyl group or a halogen atom, provided that $X^1$ to $X^8$ cannot be a hydrogen atom at the same time.

Furthermore, it is preferable that in the above formula (I), $X^1$ to $X^4$ be each independently a hydrogen atom or an unsubstituted or substituted straight-chain or branched alkyl group, and $X^5$ to $X^8$ be each independently a hydrogen atom or a halogen atom, provided that $X^1$ to $X^8$ cannot be a hydrogen atom at the same time.

It is preferable that in the above formula (I), $X^1$ to $X^4$ be each independently a hydrogen atom, an unsubstituted or substituted straight-chain or branched alkyl group, or an unsubstituted or substituted alkoxyl group, and $X^5$ to $X^8$ be each independently an unsubstituted phenyl group or a substituted phenyl group with at most two substituents which are selected from the group consisting of a straight chain or branched alkyl group which may be substituted with a halogen atom, an unsubstituted or substituted alkoxyl group, and an aryl group which may be substituted with a halogen atom.

It is preferable that in the formula (I), $X^1$ to $X^4$ be each a cyano group, and $X^5$ to $X^8$ be each independently an unsubstituted or substituted, straight chain or branched alkyl group.

It is also preferable that in the formula (I), $X^1$ to $X^4$ be each a cyano group, and $X^5$ to $X^8$ be each independently an unsubstituted or substituted aryl group.

It is also preferable that in the above formula (I), $X^1$ to $X^4$ be each a cyano group, and $X^5$ to $X^8$ be each independently a substituted phenyl group, with at least one of the substituents thereof being selected from the group consisting of a fluorine atom, a fluorine atom bonded alkyl group and a fluorine atom bonded alkoxyl group.

It is also preferable that in the above formula (I), $X^1$ to $X^4$ be each independently a hydrogen atom or an unsubstituted or substituted straight chain or branched alkyl group, and $X^5$ to $X^8$ be each independently a hydrogen atom, an unsubstituted or substituted straight chain or branched alkyl group, or a halogen atom.

It is also preferable that in the above formula (I), $X^1$ be not the same as $X^5$ ($X^1 \neq X^5$), $X^2$ be not the same as $X^6$ ($X^2 \neq X^6$), $X^3$ is not the same as $X^7$ ($X^3 \neq X^7$), and $X^4$ be not the same as $X^8$ ($X^4 \neq X^8$).

In the above-mentioned optical information recording medium, it is preferable that the recording layer further comprise at least one organic dye having a maximum absorption wavelength in the range of 680 nm to 750 nm, particularly for use in the above-mentioned high density disk system for the next generation. Examples of such organic dyes are a cyanine dye, a phthalocyanine dye and an azo metal chelate dye.

In the above-mentioned optical information recording medium, the recording layer is capable of recording information with the application of a laser beam with a wavelength of 630 nm to 720 nm thereto.

Further, the above-mentioned optical information recording medium may further comprise an undercoat layer between the substrate and the recording layer.

Furthermore, the above-mentioned optical information recording medium may further comprise a reflection layer on the recording layer. The reflection layer may also be protected with the above-mentioned protective layer.

The reflection layer may comprise a material selected from the group consisting of aluminum and gold. The protective layer may comprise an ultraviolet-curing resin.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3(a) and 3(b) are schematic cross-sectional views of examples of a further optical information recording medium according to the present invention.

DESCRIPTION OF THE PREFERRED EMBODIMENTS

Figure 1A:
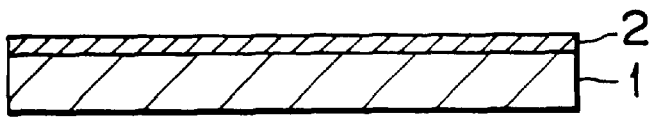
FIGS. 1(a) to 1(d) are schematic cross-sectional views of examples of an optical information recording medium according to the present invention.

The optical information recording medium of the present invention comprises a substrate, and a recording layer formed on the substrate, the recording layer comprising at least one compound selected from the group consisting of a compound represented by formula (I):

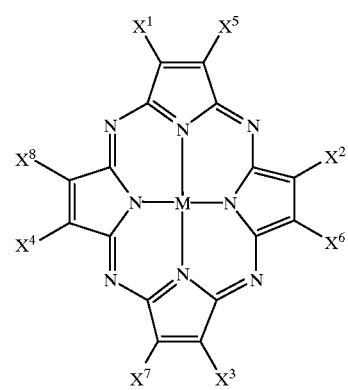

(I)

and a compound represented by formula (II):

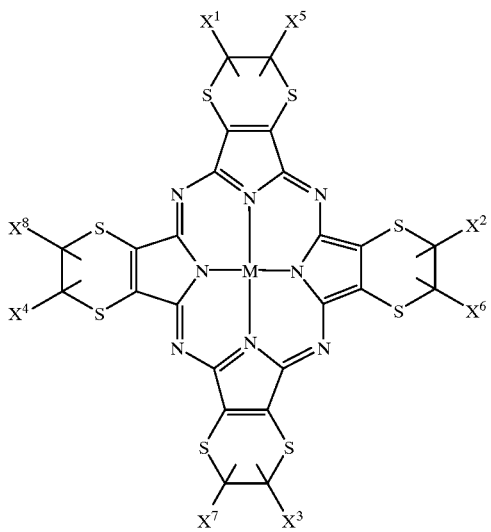

(II)

wherein:

M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an unsubstituted or substituted aryl group, an unsubstituted or substituted alkoxyl group, an unsubstituted or substituted aryloxy group, $-(OPR^1R^2)_p$, $-(OPOR^3R^4)_p$, $-(OSiR^5R^6R^7)_p$, $-(OCOR^8)_p$, $-(OR^9)_p$, $-(OCOCOOR^{10})_p$, $-(OCOCOR^{11})_p$ or $-(OCONR^{12}R^{13})_p$ in which $R^1$ to $R^{13}$ are each independently a hydrogen atom, an unsubstituted or substituted monovalent aliphatic hydrocarbon group, or an unsubstituted or substituted monovalent aromatic hydrocarbon group, and p is an integer of 0 to 2, and $X^1$ to $X^8$ are each independently a hydrogen atom, a halogen atom, a cyano group, an unsubstituted or substituted straight-chain or branched alkyl group, an unsubstituted or substituted alkoxyl group, a carboxylic acid ester group, an unsubstituted or substituted aryl group, an unsubstituted or substituted aryloxy group, an unsubstituted or substituted alkylthio group, an unsubstituted or substituted arylthio group, an unsubstituted or substituted benzyl group, an unsubstituted or substituted benzyloxy group, an unsubstituted or substituted benzylthio group or a heterocyclic group.

In the above formula (I), when all the conditions that $X^1$ is not the same as $X^5$ ($X^1 \neq X^5$), $X^2$ is not the same as $X^6$ ($X^2 \neq X^6$), $X^3$ is not the same as $X^7$ ($X^3 \neq X^7$), and $X^4$ is not the same as $X^8$ ($X^4 \neq X^8$) are satisfied, the symmetric degree of the molecule of the compound of the formula (I) is lowered, so that the solubility of the compound in solvents is increased and therefore it is easy to form a recording layer comprising the compound by a conventional coating method.

In the above case, there are the following four isomers (A), (B), (C) and (D) for the compound of the formula (I) and the following four isomers (E), (F), (G) and (H) for the compound of the formula (II):
(A)
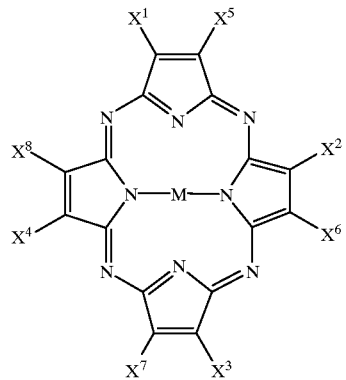
(B)
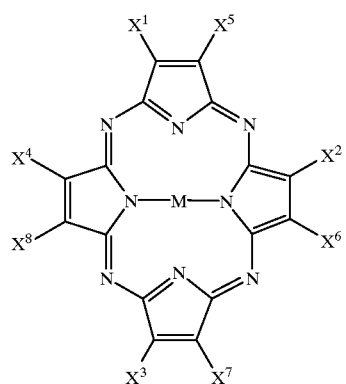
(C)
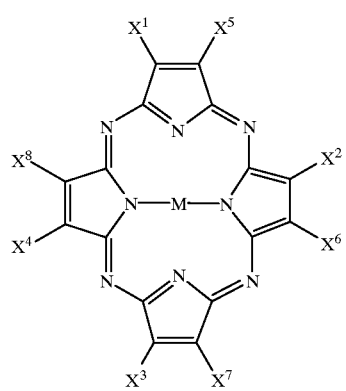
(D)
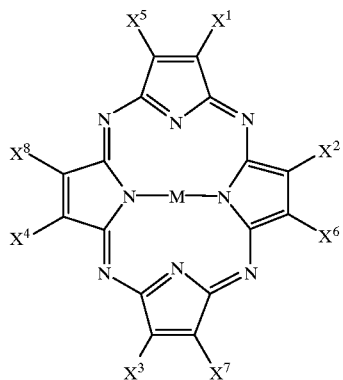
(E)
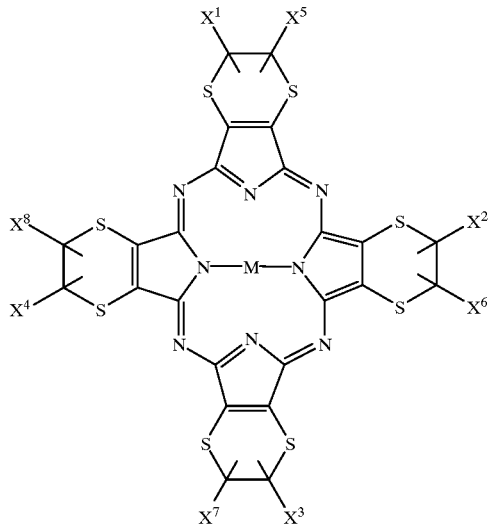
(F)
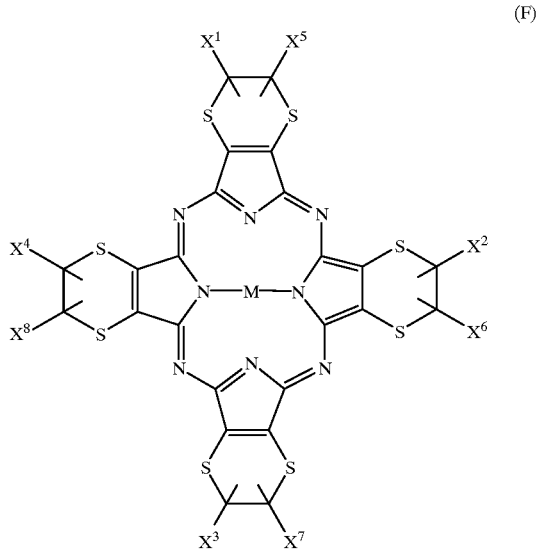

-continued

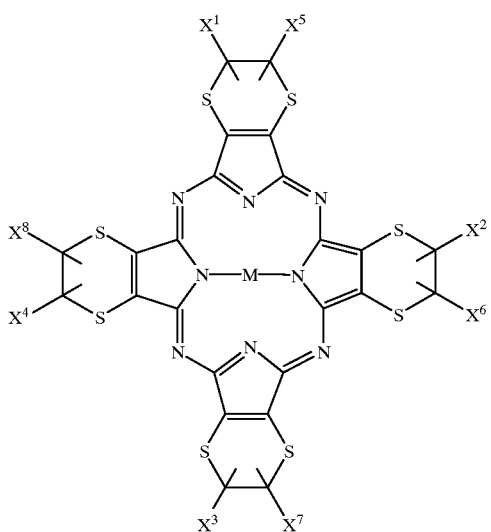

(G)

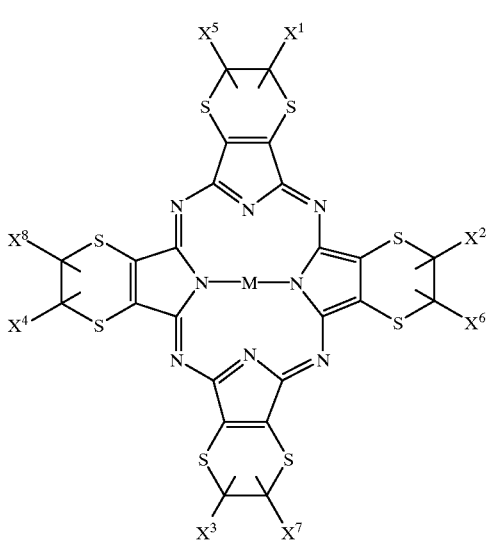

(H)

In the above formulae (I) and (II), when $X^1$ to $X^8$ are an unsubstituted or substituted straight-chain or branched alkyl group, or when the substituted alkoxyl group represented by $X^1$ to $X^8$ has an alkyl group as a substituent, specific examples of the alkyl group are as follows, provided that the alkyl group may be not only a saturated alkyl group, but also an unsaturated alkyl group:

primary alkyl groups such as methyl group, ethyl group, n-propyl group, n-butyl group, isobutyl group, n-pentyl group, neopentyl group, isoamyl group, 2-methylbutyl group, n-hexyl group, 2-methylpentyl group, 3-methylpentyl group, 4-methylpentyl group, 2-ethylbutyl group, n-heptyl group, 2-methylhexyl group, 3-methylhexyl group, 4-methylhexyl group, 5-methylhexyl group, 2-ethylpentyl group, 3-ethylpentyl group, n-octyl group, 2-methylheptyl group, 3-methylheptyl group, 4-methylheptyl group, 5-methylheptyl group, 2-ethylhexyl group, 3-ethylhexyl group, n-nonyl group, n-decyl group, and n-dodecyl group; secondary alkyl groups such as iso-propyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, and 1-isobutyl-3-methylbutyl group; tertiary alkyl groups such as tert-butyl group, tert-hexyl group, tert-amyl group, or tert-octyl group; cycloalkyl groups such as cyclohexyl group, 4-methylcyclohexyl group, 4-ethylcyclohexyl group, 4-tert-butylcyclohexyl group, 4-(2-ethylhexyl)cyclohexyl group, bornyl group, isobornyl group, and adamantane.

The above-mentioned alkyl groups may have a substituent such as a halogen atom.

Examples of the unsaturated alkyl group are ethylene group, propylene group, butylene group, hexene group, octene group, dodecene group, cyclohexene group and butyl hexene group.

Furthermore, in the above formulae (I) and (II), when $X^1$ to $X^8$ are an unsubstituted or substituted aryl group, or an unsubstituted or substituted aryloxy group, specific examples of the aryl group or the aryl moiety of the aryloxy group are phenyl group, methylphenyl group, dimethylphenyl group, trimethylphenyl group, ethylphenyl group, tert-butylphenyl group, butylphenyl group, nonylphenyl group, methoxyphenyl group, dimethoxyphenyl group, butoxyphenyl group and naphthyl group.

The above-mentioned aryl groups may also have a substituent such as a halogen atom.

In the above formulae (I) and (II), when $X^1$ to $X^8$ are an unsubstituted or substituted alkylthio group or an unsubstituted or substituted arylthio group, examples of the alkyl moiety of the alkylthio group may be the same as mentioned above with respect to the alkyl group represented by $X^1$ to $X^8$, and examples of the aryl moiety of the arylthio group may also be the same as mentioned above with respect to the aryl group represented by $X^1$ to $X^8$.

Furthermore, in the above formulae (I) and (II), when $X^1$ to $X^8$ are a heterocyclic group, specific examples of the heterocyclic group are pyridinyl group, pyridazinyl group, pyrimidinyl group, pyrazinyl group and thiophenyl group.

As mentioned above, in the above formulae (I) and (II), M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an unsubstituted or substituted aryl group, an unsubstituted or substituted alkoxyl group, an unsubstituted or substituted aryloxy group, $-(OPR^1R^2)_p$, $-(OPOR^3R^4)_p$, $-(OSiR^5R^6R^7)_p$, $-(OCOR^8)_p$, $-(OR^9)_p$, $-(OCOCOOR^{10})_p$, $-(OCOCOR^{11})_p$ or $-(OCONR^{12}R^{13})_p$ in which $R^1$ to $R^{13}$ are each independently a hydrogen atom, an unsubstituted or substituted monovalent aliphatic hydrocarbon group, or an unsubstituted or substituted monovalent aromatic hydrocarbon group, and p is an integer of 0 to 2.

Specific examples of M are two individual hydrogen atoms, bivalent metals such as Ca, Mg, Zu, Cu, Ni, Pd, Fe, Pb, Co, Pt, Cd and Ru; a halogenide moiety, a hydroxyl compound moiety, an alkoxy compound moiety, and a trialkyl siloxy compound moiety of a trivalent metal such as Al, In, Fe, Ga, Ti or Mn; a halogenide moiety, a hydroxyl compound moiety, an alkoxy compound moiety, a trialkyl siloxy compound moiety and an oxide moiety of a tetravalent metal such as Si, Ti, Sn, Cr, Ga, Sn, Mn or Zr.

In the above-mentioned groups, —(OPR¹R²)$_p$, —(OPOR³R⁴)$_p$, —(OSiR⁵R⁶R⁷)$_p$, —(OCOR⁸)$_p$, —(OR⁹)$_p$, —(OCOCOOR¹⁰)$_p$, —(OCOCOR¹¹)$_p$ or —(OCONR¹² R¹³)$_p$, when R¹ to R¹³ are a monovalent aliphatic hydrocarbon group, specific examples thereof are alkyl groups such an methyl group, ethyl group, propyl group, isopropyl group, butyl group, isobutyl group, sec-butyl group, tert-butyl group, amyl group, hexyl group, octyl group, decyl group, dodecyl group and octadecyl group, and alkenyl groups such as vinyl group, allyl group, isopropenyl group, 1-butenyl group, 2-butenyl group and 2-pentenyl group; and when R¹ to R¹³ are a monovalent aromatic hydrocarbon group, specific examples thereof are phenyl group and benzyl group. Substituents for the monovalent aliphatic hydrocarbon group and the monovalent aromatic hydrocarbon group are, for example, a halogen atom such as a fluorine atom, a chlorine atom or a bromine atom, a trifluorocarbon group, cyano group, and an ester group.

In the formula (I), $X^5$ to $X^8$ may be

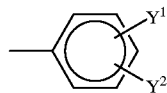

wherein $Y^1$ and $Y^2$ are each independently an alkyl group, an alkoxyl group, or an aryl group.

Examples of the alkyl group represented by $Y^1$ and $Y^2$ or the alkyl moiety of the alkoxyl group represented by $Y^1$ and $Y^2$ are primary alkyl groups such as methyl group, ethyl group, n-propyl group, n-butyl group, isobutyl group, n-pentyl group, neopentyl group, isoamyl group, 2-methylbutyl group, n-hexyl group, 2-methylpentyl group, 3-methylpentyl group, 4-methylpentyl group, 2-ethylbutyl group, n-heptyl group, 2-methylhexyl group, 3-methylhexyl group, 4-methylhexyl group, 5-methylhexyl group, 2-ethylpentyl group, 3-ethylpentyl group, n-octyl group, 2-methylheptyl group, 3-methylheptyl group, 4-methylheptyl group, 5-methylheptyl group, 2-ethylhexyl group, 3-ethylhexyl group, n-nonyl group, n-decyl group, and n-dodecyl group; secondary alkyl groups such as isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, and 1-isobutyl-3-methylbutyl group; and tertiary alkyl groups such an tert-butyl group, tert-hexyl group, tert-amyl group, and tert-octyl group. These alkyl groups may have a substituent such as a halogen atom.

Examples of the aryl group represented by $Y^1$ and $Y^2$ are phenyl group, methylphenyl group, dimethylphenyl group, ethylphenyl group, tert-butylphenyl group, butylphenyl group, methoxyphenyl group, dimethoxyphenyl group, and butoxyphenyl group. These aryl groups may have a substituent such as a halogen atom.

In the formula (I), $X^1$ to $X^4$ may be a cyano group and $X^5$ to $X^8$ may be

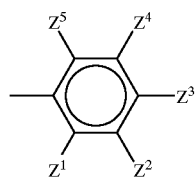

wherein $Z^1$ to $Z^5$ are each independently a hydrogen atom, a halogen atom, preferably a bromine atom and a chlorine atom, a straight chain or branched alkyl group which may have a halogen atom as a substituent, an alkoxyl group which may have as a substituent a halogen atom or an alkoxy group, an aryl group which may have a halogen atom as a substituent, an alkylamino group, an alkylthio group, an alkylsilyl group, hydroxyl group, nitro group, nitrile group, and a carboxylic acid ester group.

Examples of the alkyl group represented by $Z^1$ to $Z^5$ or the alkyl moiety of the alkoxyl group represented by $Z^1$ to $Z^5$ are primary alkyl groups such as methyl group, ethyl group, n-propyl group, n-butyl group, isobutyl group, n-pentyl group, neopentyl group, isoamyl group, 2-methylbutyl group, n-hexyl group, 2-methylpentyl group, 3-methylpentyl group, 4-methylpentyl group, 2-ethylbutyl group, n-heptyl group, 2-methylhexyl group, 3-methylhexyl group, 4-methylhexyl group, 5-methylhexyl group, 2-ethylpentyl group, 3-ethylpentyl group, n-octyl group, 2-methylheptyl group, 3-methylheptyl group, 4-methylheptyl group, 5-methylheptyl group, 2-ethylhexyl group, 3-ethylhexyl group, n-nonyl group, n-decyl group, and n-dodecyl group; secondary alkyl groups such as isopropyl group, sec-butyl group, 1-ethylpropyl group, 1-methylbutyl group, 1,2-dimethylpropyl group, 1-methylheptyl group, 1-ethylbutyl group, 1,3-dimethylbutyl group, 1,2-dimethylbutyl group, 1-ethyl-2-methylpropyl group, 1-methylhexyl group, 1-ethylheptyl group, 1-propylbutyl group, 1-isopropyl-2-methylpropyl group, 1-ethyl-2-methylbutyl group, 1-propyl-2-methylpropyl group, 1-methylheptyl group, 1-ethylhexyl group, 1-propylpentyl group, 1-isopropylpentyl group, 1-isopropyl-2-methylbutyl group, 1-isopropyl-3-methylbutyl group, 1-methyloctyl group, 1-ethylheptyl group, 1-propylhexyl group, and 1-isobutyl-3-methylbutyl group; and tertiary alkyl groups such an tert-butyl group, tert-hexyl group, tert-amyl group, and tert-octyl group. These alkyl groups may have a substituent such as a halogen atom.

Examples of the aryl group represented by $Z^1$ to $Z^5$ are phenyl group, methylphenyl group, dimethylphenyl group, trimethylphenyl group, ethylphenyl group, tert-butylphenyl group, di(tert-butyl)phenyl group, butylphenyl group, methoxyphenyl group, dimethoxyphenyl group, trimethoxyphenyl group and butoxyphenyl group. These aryl groups may have any of the following substituents: an alkyl group such as methyl group, ethyl group, butyl group, ixobutyl group, n-pentyl group, neopentyl group, isopropyl group, sec-butyl group, 2-ethylpropyl group, 1-methylbutyl group, tert-butyl group, tert-hexyl group or ter-amyl group; an alkoxyl group, with examples of the alkyl moiety thereof being the above-mentioned alkyl groups; fluorine substituted alkyl group such as trifluoromethyl group; fluorine substituted alkoxyl group; a halogen atom; nitro group; cyano group; and hydroxyl group.

When $Z^1$ to $Z^5$ are a carboxylic acid ester group, examples of the alkyl moiety thereof are methyl, ethyl, propyl, isopropyl, butyl, isobutyl and tert-butyl groups.

Of the above-mentioned compounds of formula (I) and formula (II), the compounds of formula (I) are more preferable than the compounds of formula (II) for use in the present invention.

Further, of the compounds of formula (I), the following compounds are more preferable in view of the combination of the substituents of $X^1$ to $X^4$ and the substituents of $X^5$ to $X^8$:

Compounds of formula (I) in which $X^1$ to $X^4$ are an unsubstituted or substituted, straight chain or branched alkyl group, further more preferably an unsubstituted or substituted, straight chain or branched alkyl group having 5 or more carbon atoms, and $X^5$ to $X^8$ are each independently a hydrogen atom and a halogen atom;

Compounds of formula (I) in which $X^1$ to $X^4$ are an unsubstituted or substituted, straight chain or branched alkyl group, and $X^5$ to $X^8$ are an unsubstituted or substituted aryl group;

Compounds of formula (I) in which $X^1$ to $X^4$ are cyano group, and $X^5$ to $X^8$ are each independently an unsubstituted or substituted aryl group;

Compounds of formula (I) in which $X^1$ to $X^4$ are cyano group, and $X^5$ to $X^8$ are each independently an unsubstituted or substituted, straight chain or branched alkyl group;

Compounds of formula (I) in which $X^1$ to $X^4$ are each independently a halogen atom, and $X^5$ to $X^8$ are each independently an unsubstituted or substituted, straight chain or branched alkoxyl group, or an aryloxy group; and Compounds of formula (I) in which $X^1$ to $X^4$ are each independently an unsubstituted or substituted aryl group, and $X^5$ to $X^8$ are each independently a carboxylic acid ester group.

In the substituents represented by $X^1$ to $X^8$ in the compounds of formulae (I) and (II), in particular, with respect to the combination of the substituents of $X^1$ to $X^4$ and the substituents of $X^5$ to $X^8$, the substituents of $X^1$ to $X^4$ and the substituents of $X^5$ to $X^8$ may be exchanged with each other.

Specific examples of the compound of the formula (I) and the compound of the formula (II) are shown in TABLES 1-(1) to 1-(4) and TABLE 2. In these TABLES, isomers are not shown, but there are four isomers with respect to each compound, for example, in No. 1, No. 7, No. 11, No. 14, and Nos. 26 to 56 shown in TABLE 1-(1).

TABLE 1-(1)
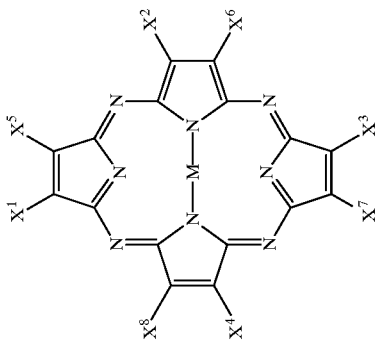
(I)
| Comp. No. | M | X¹ | X² | X³ | X⁴ | X⁵ | X⁶ | X⁷ | X⁸ |
|---|---|---|---|---|---|---|---|---|---|
| 1 | Cu | —C(CH₃)₃ | *X¹ | *X¹ | *X¹ | H | H | H | H |
| 2 | Cu | 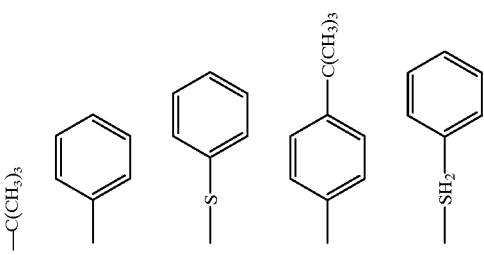 | *X¹ | *X¹ | *X¹ | *X¹ | *X¹ | *X¹ | *X¹ |
| 3 | Zn | —S—C₆H₅ | *X¹ | *X¹ | *X¹ | *X¹ | *X¹ | *X¹ | *X¹ |
| 4 | Ni | —CH₂—C₆H₄—C(CH₃)₃ | *X¹ | *X¹ | Br | *X¹ | *X¹ | *X¹ | H |
| 5 | Si[OPO(Ph)₂]₂ | —SH₂—C₆H₅ | *X¹ | *X¹ | *X¹ | *X¹ | *X¹ | *X¹ | *X¹ |

TABLE 1-(1)-continued (I)

[Structure: porphyrazine macrocycle with central M and substituents X¹–X⁸]

| Comp. No. | M | X¹ | X² | X³ | X⁴ | X⁵ | X⁶ | X⁷ | X⁸ |
|---|---|---|---|---|---|---|---|---|---|
| 6 | Ni | 4-(C(CH₃)₃)-C₆H₄-CH₃ (p-tert-butyl-tolyl) | *X¹ | *X¹ | *X¹ | *X¹ | *X¹ | *X¹ | *X¹ |
| 7 | Pd | —OC₄H₉ | *X¹ | *X¹ | *X¹ | H | H | H | H |
| 8 | Si(OCOCOOC₄H₉)₂ | 4-pyridyl | *X¹ | *X¹ | *X¹ | *X¹ | *X¹ | *X¹ | *X¹ |
| 9 | Cu | 4-(C(CH₃)₃)-C₆H₄-CH₃ | Cl | *X² | phenyl | *X¹ | H | H | H |
| 10 | Si(OH)₂ | —CH₂—C₆H₅ (benzyl) | *X¹ | *X¹ | *X¹ | H | *X¹ | *X¹ | *X¹ |
| 11 | Mg | —COOC₂H₅ | *X¹ | *X¹ | *X¹ | H | H | H | H |

TABLE 1-(1)-continued
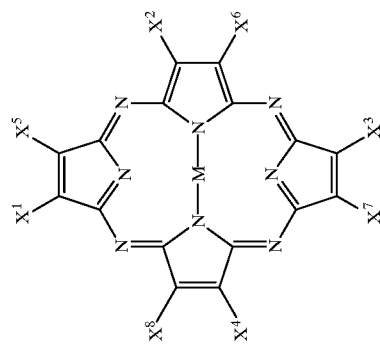
(I)
| Comp. No. | M | X¹ | X² | X³ | X⁴ | X⁵ | X⁶ | X⁷ | X⁸ |
|---|---|---|---|---|---|---|---|---|---|
| 12 | Co | ![2-methoxy-5-methylphenyl: H₃C—C₆H₃(OCH₃)] | *X¹ | *X¹ | *X¹ | *X¹ | *X¹ | *X¹ | *X¹ |
| 13 | Fe | —OCH₂C(CH₃)₃ | *X¹ | *X¹ | *X¹ | *X¹ | *X¹ | *X¹ | *X¹ |
| 14 | TiO | 4-(tert-butyl)phenyl (—C₆H₄—C(CH₃)₃) | *X¹ | *X¹ | *X¹ | H | H | H | H |
| 15 | Pt | —(CH₂)₃CH(CH₃)₂ | *X¹ | *X¹ | *X¹ | H | H | H | H |
| 16 | Mg | 2,5-dimethylphenyl (H₃C—C₆H₃—CH₃) | *X¹ | *X¹ | *X¹ | *X¹ | *X¹ | *X¹ | *X¹ |

TABLE 1-(1)-continued

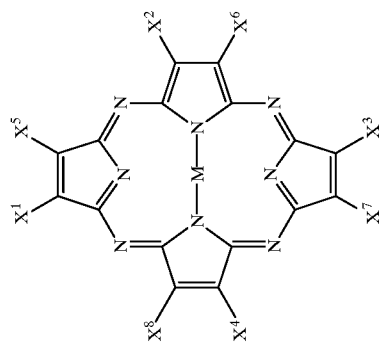

(I)

| Comp. No. | M | X$^1$ | X$^2$ | X$^3$ | X$^4$ | X$^5$ | X$^6$ | X$^7$ | X$^8$ |
|---|---|---|---|---|---|---|---|---|---|
| 17 | Si[OSi(C$_6$H$_{13}$)$_3$]$_2$ | —C$_6$H$_5$ (phenyl) | *X$^1$ | *X$^1$ | *X$^1$ | *X$^1$ | *X$^1$ | *X$^1$ | *X$^1$ |
| 18 | Si[OSi(C$_4$H$_9$)$_3$]$_2$ | —CH$_2$OC$_4$H$_9$ | *X$^1$ | *X$^1$ | *X$^1$ | *X$^1$ | *X$^1$ | *X$^1$ | *X$^1$ |
| 19 | Si[OPO(C$_6$H$_5$)$_2$]$_2$ | —C$_6$H$_5$ (phenyl) | *X$^1$ | *X$^3$ | *X$^1$ | *X$^1$ | *X$^1$ | *X$^1$ | *X$^1$ |
| 20 | Si[OPO(C$_6$H$_5$)$_2$]$_2$ | 4-tert-butylphenyl | *X$^1$ | *X$^1$ | *X$^2$ | *X$^1$ | *X$^1$ | *X$^1$ | *X$^1$ |
| 21 | VO | 2,5-dimethylphenyl | *X$^1$ | *X$^1$ | *X$^1$ | *X$^1$ | *X$^1$ | *X$^1$ | *X$^1$ |

TABLE 1-(1)-continued
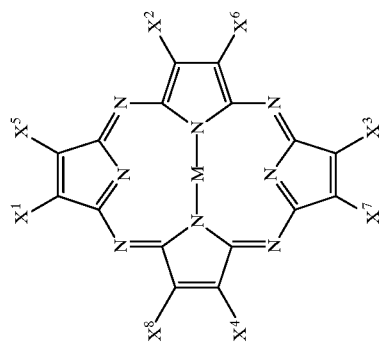
(I)
| Comp. No. | M | X¹ | X² | X³ | X⁴ | X⁵ | X⁶ | X⁷ | X⁸ |
|---|---|---|---|---|---|---|---|---|---|
| 22 | VO | 4-methylpyridyl | *X¹ | *X¹ | *X¹ | *X¹ | *X¹ | *X¹ | *X¹ |
| 23 | Cu | —(CH₂)₃C(CH₃)₃ | *X¹ | *X¹ | *X¹ | *X¹ | *X¹ | *X¹ | *X¹ |
| 24 | Si[OSi(C₆H₁₃)₃]₂ | 1-methylnaphthyl | *X¹ | *X¹ | *X¹ | *X¹ | *X¹ | *X¹ | *X¹ |

TABLE 1-(1)-continued

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 25 | Si[OPO(C$_6$H$_5$)$_2$]$_2$ | 1-methylnaphthyl | *$X^1$ | *$X^1$ | *$X^1$ | *$X^1$ | *$X^1$ | *$X^1$ | *$X^1$ |
| 26 | Cu | —C$_2$H$_5$ | *$X^1$ | *$X^1$ | *$X^1$ | tolyl | *$X^5$ | *$X^5$ | *$X^5$ |
| 27 | Ni | —CH$_3$ | *$X^1$ | *$X^1$ | *$X^1$ | tolyl | *$X^5$ | *$X^5$ | *$X^5$ |
| 28 | Co | —C$_4$H$_9$ | *$X^1$ | *$X^1$ | *$X^1$ | tolyl | *$X^5$ | *$X^5$ | *$X^5$ |

TABLE 1-(1)-continued

| Comp. No. | M | X¹ | X² | X³ | X⁴ | X⁵ | X⁶ | X⁷ | X⁸ |
|---|---|---|---|---|---|---|---|---|---|
| 29 | Pd | —CH$_3$ | *X¹ | *X¹ | *X¹ | —(CH$_2$)$_3$CH(CH$_3$)$_2$ | *X⁵ | *X⁵ | *X⁵ |
| 30 | Pt | —CH$_3$ | *X¹ | *X¹ | *X¹ | —(CH$_2$)$_2$CH(CH$_3$)$_2$ | *X⁵ | *X⁵ | *X⁵ |
| 31 | Fe | —CH$_3$ | *X¹ | *X¹ | *X¹ | —(CH$_2$)$_2$CH(CH$_3$)$_2$ | *X⁵ | *X⁵ | *X⁵ |
| 32 | Mg | —CH$_3$ | *X¹ | *X¹ | *X¹ | —(CH$_2$)$_2$CH(CH$_3$)$_2$ | *X⁵ | *X⁵ | *X⁵ |
| 33 | Cu | —C(CH$_3$)$_3$ | *X¹ | *X¹ | *X³ | —C$_6$H$_4$CH$_3$ (tolyl) | *X⁵ | H | *X⁷ |
| 34 | Ni | —C(CH$_3$)$_3$ | *X¹ | *X¹ | *X³ | Br | *X⁵ | H | *X⁷ |
| 35 | Si[OSi(C$_6$H$_{13}$)$_3$]$_2$ | —C$_4$H$_9$ | *X¹ | *X¹ | *X¹ | Cl | *X⁵ | *X⁵ | *X⁵ |
| 36 | Si(OCOC$_7$H$_{15}$)$_2$ | —CH$_3$ | *X¹ | *X¹ | *X¹ | Br | *X⁵ | *X⁵ | *X⁵ |
| 37 | Si[OPO(Ph)$_2$]$_2$ | —CH$_3$ | *X¹ | *X¹ | *X¹ | —(CH$_2$)$_3$CH(CH$_3$)$_2$ | *X⁵ | *X⁵ | *X⁵ |
| 38 | Si(OCOCOOC$_4$H$_9$)$_2$ | —CH$_3$ | *X¹ | *X¹ | *X¹ | —COOC$_2$H$_5$ | *X⁵ | *X⁵ | *X⁵ |

(I)

TABLE 1-(1)-continued

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 39 | Si[OCON(C$_4$H$_9$)$_2$]$_2$ | —C(CH$_3$)$_3$ | *X$^1$ | *X$^1$ | *X$^1$ | H | *X$^5$ | *X$^5$ | *X$^5$ |
| 40 | Si(OCOCOC$_4$H$_9$)$_2$ | —C(CH$_3$)$_3$ | *X$^1$ | *X$^1$ | *X$^1$ | H | *X$^5$ | *X$^5$ | *X$^5$ |
| 41 | Ni | —CH$_2$OC$_4$H$_9$ | *X$^1$ | *X$^1$ | *X$^1$ | —OCH$_3$ | *X$^5$ | *X$^5$ | *X$^5$ |
| 42 | Pd | —S—C$_6$H$_5$ | *X$^1$ | *X$^1$ | *X$^1$ | H | *X$^5$ | *X$^5$ | *X$^5$ |
| 43 | Cu | —CH$_3$ | *X$^1$ | *X$^1$ | *X$^1$ | —C$_6$H$_4$—C(CH$_3$)$_3$ | *X$^5$ | *X$^5$ | *X$^5$ |
| 44 | Cu | —SCH$_2$—C$_6$H$_5$ | *X$^1$ | *X$^1$ | *X$^1$ | —S(CH$_3$)$_3$ | *X$^5$ | *X$^5$ | *X$^5$ |
| 45 | Zn | —OCH$_3$ | *X$^1$ | *X$^1$ | *X$^1$ | —CH$_3$ | *X$^5$ | *X$^5$ | *X$^5$ |

(I)

TABLE 1-(1)-continued

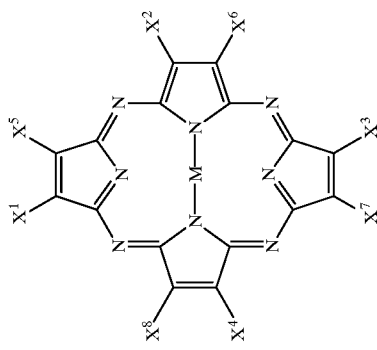

(I)

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 46 | TiO | 2,4-dimethyl-methoxyphenyl | $*X^1$ | $*X^1$ | $*X^1$ | 4-methylphenyl | $*X^5$ | $*X^5$ | $*X^5$ |
| 47 | VO | —$OCH_3$ | $*X^1$ | $*X^1$ | $*X^1$ | 4-methylphenyl | $*X^5$ | $*X^5$ | $*X^5$ |
| 48 | Ni | —$C_2H_5$ | $*X^1$ | $*X^1$ | $*X^1$ | —$CH_3$ | $*X^5$ | $*X^5$ | $*X^5$ |
| 49 | Pt | —$C(CH_3)_3$ | $*X^1$ | $*X^1$ | $*X^1$ | 4-methylphenyl | $*X^5$ | $*X^5$ | $*X^5$ |
| 50 | Pd | —$S(CH_3)_3$ | $*X^1$ | $*X^1$ | $*X^1$ | H | $*X^5$ | $*X^5$ | $*X^5$ |
| 51 | Cu | —$OC_8H_{17}$ | $*X^1$ | $*X^1$ | $*X^1$ | —$CH_3$ | $*X^5$ | $*X^5$ | $*X^5$ |

TABLE 1-(1)-continued

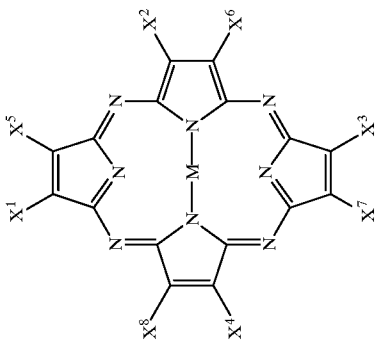

(I)

| Comp. No. | M | X¹ | X² | X³ | X⁴ | X⁵ | X⁶ | X⁷ | X⁸ |
|---|---|---|---|---|---|---|---|---|---|
| 52 | H₂ | —C₄H₉ | *X¹ | *X¹ | *X¹ | [pyridyl-CH₃] | *X⁵ | *X⁵ | *X⁵ |
| 57 | Cu | C(CH₃)₃ | *X¹ | *X¹ | *X¹ | OC₄H₉ | *X⁵ | *X⁵ | *X⁵ |
| 58 | VO | C(CH₃)₃ | *X¹ | *X¹ | *X¹ | OC₄H₉ | *X⁵ | Br | *X⁷ |
| 59 | Zn | C₆H₁₃ | *X¹ | *X¹ | *X¹ | OCH₂C(CH₃)₃ | *X⁵ | Br | *X⁷ |
| 60 | VO | CH₂C(CH₃)₃ | *X¹ | *X¹ | *X¹ | OCH₂C(CH₃)₃ | *X⁵ | *X⁵ | *X⁵ |
| 61 | VO | CH₂C(CH₃)₃ | *X¹ | *X¹ | *X¹ | OCH₃ | *X⁵ | *X⁵ | H |
| 62 | Fe | C₈H₁₇ | *X¹ | *X¹ | *X¹ | OCH₃ | *X⁵ | *X⁵ | *X⁵ |
| 63 | Mg | C₂H₄CH(CH₃)₂ | *X¹ | *X¹ | *X¹ | OC₂H₅ | *X⁵ | *X⁵ | *X⁵ |
| 64 | Cu | C(CH₃)₃ | *X¹ | *X¹ | *X¹ | OC₂H₅ | *X⁵ | *X⁵ | *X⁵ |
| 65 | VO | C(CH₃)₃ | *X¹ | *X¹ | *X¹ | OC₂H₅ | *X⁵ | *X⁵ | H |
| 66 | Si[OSi(C₆H₁₃)₃]₂ | C₁₂H₂₅ | *X¹ | *X¹ | *X¹ | OCH(CH₃)₂ | *X⁵ | *X⁵ | *X⁵ |
| 67 | Si(OCOC₇H₂₅)₂ | C₆H₁₃ | *X¹ | *X¹ | *X¹ | OCH(CH₃)₂ | *X⁵ | *X⁵ | *X⁵ |
| 68 | Si(OPO(Ph)₂)₂ | C₆H₁₃ | *X¹ | *X¹ | *X¹ | OCH(CH₃)₂ | *X⁵ | *X⁵ | *X⁵ |
| 69 | Si(OCOCOC₄H₉)₂ | CH₂C(CH₃)₃ | *X¹ | *X¹ | *X¹ | OC₂H₅ | *X⁵ | *X⁵ | *X⁵ |
| 70 | Si[OCON(C₄H₉)₂]₂ | CH₂C(CH₃)₃ | *X¹ | *X¹ | *X¹ | OC₄H₉ | *X⁵ | *X⁵ | *X⁵ |
| 71 | Si(OCOCOC₄H₉)₂ | C₈H₁₇ | *X¹ | *X¹ | *X¹ | OC₈H₁₇ | *X⁵ | *X⁵ | *X⁵ |
| 72 | Co | CH₂C(CH₃)₃ | *X¹ | *X¹ | *X¹ | OC₆H₁₃ | *X⁵ | *X⁵ | *X⁵ |
| 73 | Pd | C₂H₄C(CH₃)₃ | *X¹ | *X¹ | *X¹ | OC₆H₁₃ | *X⁵ | *X⁵ | *X⁵ |
| 74 | Cu | C₃H₆CH(CH₃)₂ | *X¹ | *X¹ | *X¹ | OC₆H₁₃ | *X⁵ | *X⁵ | *X⁵ |
| 75 | Ni | C₂H₄CH(CH₃)₂ | *X¹ | *X¹ | *X¹ | OC₆H₁₃ | *X⁵ | Br | *X⁵ |
| 76 | RhCl | C₃H₆CH(CH₃)₂ | *X¹ | *X¹ | *X¹ | OC₆H₁₃ | *X⁵ | *X⁵ | Cl |
| 77 | TiO | CH(C₂H₅)C(CH₃)₃ | *X¹ | *X¹ | *X¹ | OCH(CH₃)C(CH₃)₃ | *X⁵ | *X⁵ | *X⁵ |
| 78 | VO | C₁₂H₂₅ | *X¹ | *X¹ | *X¹ | OCH(CH₃)C(CH₃)₃ | *X⁵ | *X⁵ | *X⁵ |

TABLE 1-(1)-continued (I)

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 79 | Ni | $CH(C_2H_5)C(CH_3)_3$ | *$X^1$ | *$X^1$ | H | $OCH(CH_3)C(CH_3)_3$ | *$X^5$ | *$X^5$ | *$X^5$ |
| 80 | Pt | $CH(CH_3)_2C(CH_3)_3$ | *$X^1$ | *$X^1$ | *$X^1$ | $OCH(CH_3)C(CH_3)_3$ | *$X^5$ | *$X^5$ | *$X^5$ |
| 81 | VO | $CH(CH_3)_2C(CH_3)_3$ | *$X^1$ | *$X^1$ | *$X^1$ | $OC_5H_{11}$ | *$X^5$ | *$X^5$ | *$X^5$ |
| 82 | Cu | $C_{12}H_{25}$ | *$X^1$ | *$X^1$ | *$X^1$ | $OC_5H_{11}$ | *$X^5$ | *$X^5$ | *$X^5$ |
| 83 | $H_2$ | $C_7H_{15}$ | *$X^1$ | *$X^1$ | *$X^1$ | $OC_5H_{11}$ | *$X^5$ | *$X^5$ | *$X^5$ |
| 84 | Cu | $CH(C_2H_5)CH(CH_3)_2$ | *$X^1$ | *$X^1$ | *$X^1$ | $OC_5H_{11}$ | *$X^5$ | *$X^5$ | *$X^5$ |
| 85 | $Si(OH)_2$ | $C(CH_3)_2CH(CH_3)_2$ | *$X^1$ | *$X^1$ | *$X^1$ | $OC_2H_5$ | *$X^5$ | *$X^5$ | *$X^5$ |
| 86 | Co | $C(CH_3)_2CH(CH_3)_2$ | *$X^1$ | *$X^1$ | *$X^1$ | $OCH_3$ | *$X^5$ | *$X^5$ | *$X^5$ |
| 87 | Zn | $C(CH_3)_3$ | *$X^1$ | *$X^1$ | *$X^1$ | $OCH(CH_3)_2$ | *$X^5$ | *$X^5$ | *$X^5$ |
| 88 | Cu | $C(CH_3)_3$ | *$X^1$ | *$X^1$ | *$X^1$ | Br | *$X^5$ | *$X^5$ | Br |
| 89 | VO | $C_6H_{33}$ | *$X^1$ | *$X^1$ | *$X^1$ | Br | *$X^5$ | *$X^5$ | *$X^5$ |
| 90 | Zn | $CH_2C(CH_3)_3$ | *$X^1$ | *$X^1$ | *$X^1$ | Br | *$X^5$ | *$X^5$ | *$X^5$ |
| 91 | VO | $CH_2C(CH_3)_3$ | *$X^1$ | *$X^1$ | *$X^1$ | Cl | *$X^5$ | *$X^5$ | *$X^7$ |
| 92 | VO | $C_8H_{17}$ | *$X^1$ | *$X^1$ | *$X^1$ | Cl | *$X^5$ | H | H |
| 93 | Fe | $C_2H_4CH(CH_3)_2$ | *$X^1$ | *$X^1$ | *$X^1$ | Br | *$X^5$ | *$X^5$ | *$X^5$ |
| 94 | Mg | $C(CH_3)_3$ | *$X^1$ | *$X^1$ | *$X^1$ | H | *$X^5$ | *$X^5$ | *$X^5$ |
| 95 | Cu | $C(CH_3)_3$ | *$X^1$ | *$X^1$ | *$X^1$ | H | *$X^5$ | *$X^5$ | *$X^5$ |
| 96 | VO | $C_{12}H_{25}$ | *$X^1$ | *$X^1$ | *$X^1$ | Br | *$X^5$ | *$X^5$ | *$X^5$ |
| 97 | $Si[OSi(C_6H_{13})_3]_2$ | $C_6H_{13}$ | *$X^1$ | *$X^1$ | *$X^1$ | Br | *$X^5$ | *$X^5$ | *$X^5$ |
| 98 | $Si(OCOC_7H_{15})_2$ | $C_6H_{13}$ | *$X^1$ | *$X^1$ | *$X^1$ | Br | *$X^5$ | *$X^5$ | *$X^5$ |
| 99 | $Si[OPO(Ph)_2]_2$ | $CH_2C(CH_3)_3$ | *$X^1$ | *$X^1$ | *$X^1$ | Br | *$X^5$ | *$X^5$ | *$X^5$ |
| 100 | $Si(OCOCOOC_4H_9)_2$ | $CH_2C(CH_3)_3$ | *$X^1$ | *$X^1$ | *$X^1$ | Cl | *$X^5$ | *$X^5$ | *$X^5$ |
| 101 | $Si(OCON(C_4H_9)_2)_2$ | $C_8H_{17}$ | *$X^1$ | *$X^1$ | *$X^1$ | Cl | *$X^5$ | *$X^5$ | *$X^5$ |
| 102 | $Si(OCOCOOC_4H_9)_2$ | $CH_2C(CH_3)_3$ | *$X^1$ | *$X^1$ | *$X^1$ | Br | *$X^5$ | *$X^5$ | *$X^5$ |
| 103 | Zn | $C_2H_4C(CH_3)_3$ | *$X^1$ | *$X^1$ | *$X^1$ | Br | *$X^5$ | *$X^5$ | *$X^5$ |
| 104 | Pd | $C_2H_4CH(CH_3)_2$ | *$X^1$ | *$X^1$ | *$X^1$ | Br | *$X^5$ | *$X^5$ | *$X^5$ |
| 105 | Cu | $CH_2C(CH_3)_3$ | *$X^1$ | *$X^1$ | *$X^1$ | Br | *$X^5$ | *$X^5$ | *$X^5$ |
| 106 | Cu | $C_2H_4CH(CH_3)_2$ | *$X^1$ | *$X^1$ | *$X^1$ | Br | *$X^5$ | H | *$X^7$ |
| 107 | RhCl | $C_3H_6CH(CH_3)_2$ | *$X^1$ | *$X^1$ | *$X^1$ | Cl | *$X^5$ | H | *$X^7$ |

TABLE 1-(1)-continued

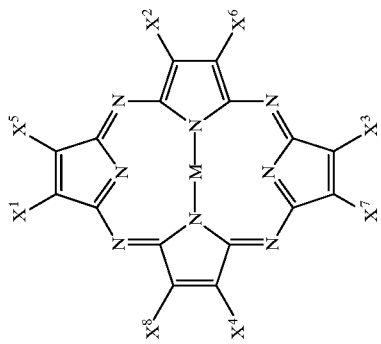
(I)

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 108 | TiO | $C_5H_{11}$ | $*X^1$ | $*X^1$ | $*X^1$ | Br | $*X^5$ | $*X^5$ | $*X^5$ |
| 109 | VO | $C_{12}H_{25}$ | $*X^1$ | $*X^1$ | $*X^1$ | Br | $*X^5$ | $*X^5$ | $*X^5$ |
| 110 | Ni | $C_7H_{25}$ | $*X^1$ | $*X^1$ | $*X^1$ | I | $*X^5$ | $*X^5$ | $*X^5$ |
| 111 | Pt | $CH(CH_3)C(CH_3)_3$ | $*X^1$ | $*X^1$ | $*X^1$ | Br | $*X^5$ | $*X^5$ | $*X^5$ |
| 112 | VO | $CH(CH_3)C(CH_3)_3$ | $*X^1$ | $*X^1$ | $*X^1$ | Br | $*X^5$ | $*X^5$ | $*X^5$ |
| 113 | Cu | $CH(C_2H_5)C(CH_3)_3$ | $*X^1$ | $*X^1$ | $*X^1$ | Br | $*X^5$ | $*X^5$ | $*X^5$ |
| 114 | $H_2$ | $CH(C_2H_5)C(CH_3)_3$ | $*X^1$ | $*X^1$ | $*X^1$ | Br | $*X^5$ | $*X^5$ | $*X^5$ |
| 115 | Cu | $CH(C_2H_5)CH(CH_3)_2$ | $*X^1$ | $*X^1$ | $*X^1$ | Br | $*X^5$ | $*X^5$ | $*X^5$ |
| 116 | Si(OH)$_2$ | $C(CH_3)_2CH(CH_3)_2$ | $*X^1$ | $*X^1$ | $*X^1$ | Br | $*X^5$ | $*X^5$ | $*X^5$ |
| 117 | Co | $C(CH_3)_2CH(CH_3)_2$ | $*X^1$ | $*X^1$ | $*X^1$ | Br | $*X^5$ | $*X^5$ | $*X^5$ |
| 118 | Zn | $C(CH_3)_3$ | $*X^1$ | $*X^1$ | $*X^1$ | Br | $*X^5$ | Br | H |
| 119 | Cu | $C(CH_3)_3$ | $*X^1$ | $*X^1$ | $*X^1$ | Br | $*X^5$ | Br | H |
| 120 | VO | $C_6H_{13}$ | $*X^1$ | $*X^1$ | $*X^1$ | $C_4H_9$ | $*X^5$ | $*X^5$ | $*X^5$ |
| 121 | Zn | $CH_2C(CH_3)_3$ | $*X^1$ | $*X^1$ | $*X^1$ | $C_4H_9$ | $*X^5$ | $*X^5$ | $*X^7$ |
| 122 | VO | $CH_2C(CH_3)_3$ | $*X^1$ | $*X^1$ | $*X^1$ | $CHC(CH_3)_2$ | $*X^5$ | $*X^5$ | $*X^7$ |
| 123 | VO | $C_8H_{17}$ | $*X^1$ | $*X^1$ | $*X^1$ | $CHC(CH_3)_2$ | $*X^5$ | $*X^5$ | $*X^7$ |
| 124 | Fe | $C_2H_4CH(CH_3)_2$ | $*X^1$ | $*X^1$ | $*X^1$ | $CH_3$ | $*X^5$ | $*X^5$ | $*X^7$ |
| 125 | Mg | $C(CH_3)_3$ | $*X^1$ | $*X^1$ | $*X^1$ | $CH_3$ | $*X^5$ | $*X^5$ | $*X^5$ |
| 126 | Cu | $C(CH_3)_3$ | $*X^1$ | $*X^1$ | $*X^1$ | $C_2H_5$ | $*X^5$ | $*X^5$ | $*X^5$ |
| 127 | VO | $C_{12}H_{25}$ | $*X^1$ | $*X^1$ | $*X^1$ | $C_2H_5$ | $*X^5$ | $*X^5$ | $*X^5$ |
| 128 | Si[OSi(C$_6$H$_{13}$)$_3$]$_2$ | $C_6H_{13}$ | $*X^1$ | $*X^1$ | $*X^1$ | $C_2H_5$ | $*X^5$ | $*X^5$ | $*X^5$ |
| 129 | Si[OCOC$_3$H$_{15}$)$_2$]$_2$ | $C_6H_{13}$ | $*X^1$ | $*X^1$ | $*X^1$ | $C_6H_{13}$ | $*X^5$ | $*X^5$ | $*X^5$ |
| 130 | Si[OPO(Ph)$_2$]$_2$ | $CH_2C(CH_3)_3$ | $*X^1$ | $*X^1$ | $*X^1$ | CycHx. | $*X^5$ | $*X^5$ | $*X^5$ |
| 131 | Si(OCOCOOC$_4$H$_9$)$_2$ | $CH_2C(CH_3)_3$ | $*X^1$ | $*X^1$ | $*X^1$ | $C_2H_5$ | $*X^5$ | $*X^5$ | $*X^5$ |
| 132 | Si(OCON(C$_4$H$_9$)$_2$)$_2$ | $CH_2C(CH_3)_3$ | $*X^1$ | $*X^1$ | $*X^1$ | $C_6H_{13}$ | $*X^5$ | $*X^5$ | $*X^5$ |
| 133 | Si(OCOCOOC$_4$H$_9$)$_2$ | $C_8H_{17}$ | $*X^1$ | $*X^1$ | $*X^1$ | $C_6H_{13}$ | $*X^5$ | $*X^5$ | H |
| 134 | Co | $CH_2C(CH_3)_3$ | $*X^1$ | $*X^1$ | $*X^1$ | CycHx. | $*X^5$ | $*X^5$ | $*X^5$ |
| 135 | Pd | $C_2H_4C(CH_3)_3$ | $*X^1$ | $*X^1$ | $*X^1$ | $C_4H_9$ | $*X^5$ | $*X^5$ | $*X^5$ |
| 136 | Cu | $C_3H_6CH(CH_3)_2$ | $*X^1$ | $*X^1$ | $*X^1$ | CycHx. | $*X^5$ | $*X^5$ | $*X^5$ |

TABLE 1-(1)-continued

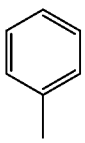

(I)

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 137 | Ni | $C_2H_4CH(CH_3)_2$ | $*X^1$ | $*X^1$ | $*X^1$ | $C_6H_{13}$ | $*X^5$ | Br | $*X^5$ |
| 138 | RhCl | $C_3H_6CH(CH_3)_2$ | $*X^1$ | $*X^1$ | $*X^1$ | $C_4H_9$ | $*X^5$ | Br | $*X^7$ |
| 139 | TiO | $CH(C_2H_5)C(CH_3)_3$ | $*X^1$ | $*X^1$ | $*X^1$ | $CH(CH_3)C(CH_3)_3$ | $*X^5$ | $*X^5$ | Cl |
| 140 | VO | $C_{12}H_{25}$ | $*X^1$ | $*X^1$ | $*X^1$ | CycHx | $*X^5$ | $*X^5$ | $*X^5$ |
| 141 | Ni | $CH(C_2H_5)C(CH_3)_3$ | $*X^1$ | $*X^1$ | $*X^1$ | $CH(CH_3)C(CH_3)_3$ | $*X^5$ | $*X^5$ | $*X^5$ |
| 142 | Pt | $CH(CH_3)C(CH_3)_3$ | $*X^1$ | $*X^1$ | H | $CH(CH_3)C(CH_3)_3$ | $*X^5$ | $*X^5$ | $*X^5$ |
| 143 | VO | $CH(CH_3)C(CH_3)_3$ | $*X^1$ | $*X^1$ | $*X^1$ | $CH(CH_3)C(CH_3)_3$ | $*X^5$ | $*X^5$ | $*X^5$ |
| 144 | Cu | $C_{12}H_{25}$ | $*X^1$ | $*X^1$ | $*X^1$ | $C_5H_{11}$ | $*X^5$ | $*X^5$ | $*X^5$ |
| 145 | $H_2$ | $C_7H_{15}$ | $*X^1$ | $*X^1$ | $*X^1$ | CycHx | $*X^5$ | $*X^5$ | $*X^5$ |
| 146 | Cu | $CH(C_2H_5)CH(CH_3)_2$ | $*X^1$ | $*X^1$ | $*X^1$ | CycHx | $*X^5$ | $*X^5$ | $*X^5$ |
| 147 | Si(OH)$_2$ | $C(CH_3)_2CH(CH_3)_2$ | $*X^1$ | $*X^1$ | $*X^1$ | $C_5H_{11}$ | $*X^5$ | $*X^5$ | $*X^5$ |
| 148 | Co | $C(CH_3)_2CH(CH_3)_2$ | $*X^1$ | $*X^1$ | $*X^1$ | $C_2H_5$ | $*X^5$ | $*X^5$ | Br |
| 149 | Zn | $C(CH_3)_3$ | $*X^1$ | $*X^1$ | $*X^1$ | $CH_3$ | $*X^5$ | $*X^5$ | $*X^5$ |
| 150 | Cu | $C(CH_3)_3$ | $*X^1$ | $*X^1$ | $*X^1$ | $CH(CH_3)_2$ | $*X^5$ | $*X^5$ | $*X^5$ |
| 151 | Ni | $C_6H_{13}$ | $*X^1$ | $*X^1$ | $*X^1$ | H | $*X^5$ | Br | $*X^5$ |
| 152 | Si(OCOC$_4$H$_9$)$_2$ | $CH_2C(CH_3)_3$ | $*X^1$ | $*X^1$ | $*X^1$ | Br | $*X^5$ | $*X^5$ | $*X^5$ |
| 153 | Co | | $*X^1$ | $*X^1$ | $*X^1$ | H | $*X^5$ | $*X^5$ | $*X^5$ |
| 154 | Pd | 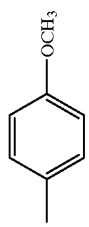 | $*X^1$ | $*X^1$ | | $CH(CH_3)_2$ | $*X^5$ | $*X^5$ | $*X^5$ |
| 155 | Fe | | $*X^1$ | $*X^1$ | $*X^1$ | $C_4H_9$ | $*X^5$ | H | $*X^7$ |

TABLE 1-(1)-continued
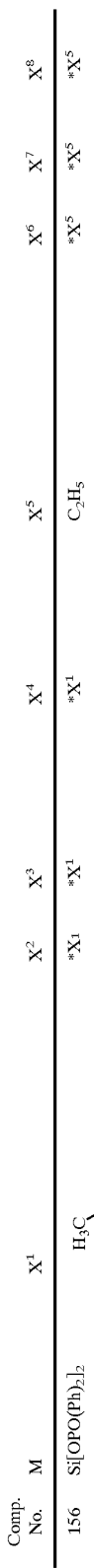
(I)
| Comp. No. | M | X¹ | X² | X³ | X⁴ | X⁵ | X⁶ | X⁷ | X⁸ |
|---|---|---|---|---|---|---|---|---|---|
| 156 | Si[OPO(Ph)₂]₂ | 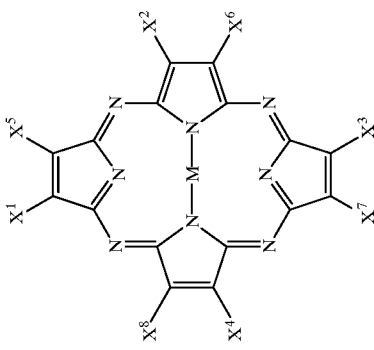 | *X¹ | *X¹ | *X¹ | C₂H₅ | *X⁵ | *X⁵ | *X⁵ |
| 157 | Cu | 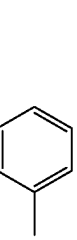 | *X¹ | *X¹ | *X¹ | C₂H₅ | *X⁵ | *X⁵ | *X⁵ |
| 158 | Pt | 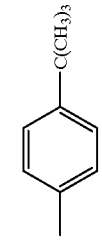 | *X¹ | *X¹ | *X¹ | CN | *X⁵ | *X⁵ | *X⁵ |
| 159 | Si[OSi(C₆H₁₃)₃]₂ | 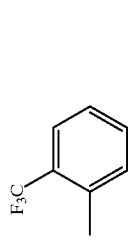 | *X¹ | *X¹ | *X¹ | CN | *X⁵ | *X⁵ | *X⁵ |

TABLE 1-(1)-continued
| Comp. No. | M | X¹ | X² | X³ | X⁴ | X⁵ | X⁶ | X⁷ | X⁸ |
|---|---|---|---|---|---|---|---|---|---|
| 160 | TiO | ![o-nitrotoluene] | *X¹ | *X¹ | *X¹ | CN | *X⁵ | *X⁵ | *X⁵ |
| 161 | Mg | ![2,6-bis(trifluoromethyl)toluene] | *X¹ | *X¹ | *X¹ | CN | *X⁵ | *X⁵ | *X⁵ |
| 162 | Zn | ![3,5-bis(trifluoromethyl)toluene] | *X¹ | *X¹ | *X¹ | CN | *X⁵ | *X⁵ | *X⁵ |
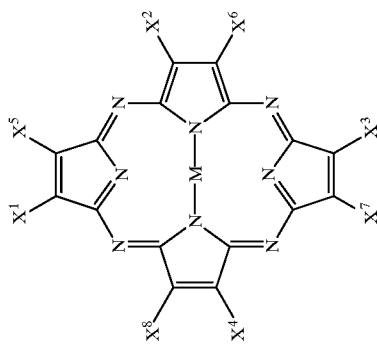

TABLE 1-(1)-continued
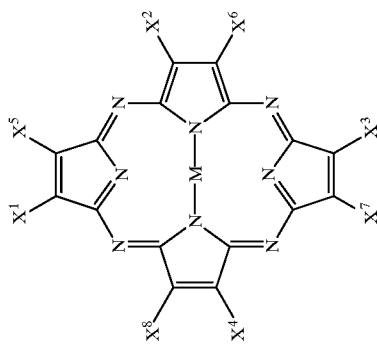
(I)
| Comp. No. | M | X¹ | X² | X³ | X⁴ | X⁵ | X⁶ | X⁷ | X⁸ |
|---|---|---|---|---|---|---|---|---|---|
| 163 | Mn | 3-methoxyphenyl | *X¹ | *X¹ | *X¹ | CN | *X⁵ | *X⁵ | *X⁵ |
| 164 | SnCl₂ | 2-chlorophenyl | *X¹ | *X¹ | *X¹ | CN | *X⁵ | *X⁵ | *X⁵ |
| 165 | Co | 2-fluorophenyl | *X¹ | *X¹ | *X¹ | CN | *X⁵ | *X⁵ | *X⁵ |
| 166 | Pd | CH₂CH(CH₃)₂ | *X¹ | *X¹ | *X¹ | CN | *X⁵ | *X⁵ | *X⁵ |
| 167 | Cu | C(C₂H₅)(CH₃)₂ | *X¹ | *X¹ | *X¹ | CN | *X⁵ | *X⁵ | *X⁵ |
| 168 | Ni | CBr(CH₃)₂ | *X¹ | *X¹ | *X¹ | CN | *X⁵ | *X⁵ | *X⁵ |
| 169 | RhCl | C(CH₃)₃ | *X¹ | *X¹ | *X¹ | CN | *X⁵ | *X⁵ | *X⁵ |

TABLE 1-(1)-continued (I)

| Comp. No. | M | X¹ | X² | X³ | X⁴ | X⁵ | X⁶ | X⁷ | X⁸ |
|---|---|---|---|---|---|---|---|---|---|
| 170 | TiO | 3-methylphenyl | *X¹ | *X¹ | *X¹ | COOC₄H₉ | *X⁵ | *X⁵ | *X⁵ |
| 171 | VO | phenyl | *X¹ | *X¹ | *X¹ | COOC₂H₅ | *X⁵ | *X⁵ | *X⁵ |
| 172 | Ni | 2-(trifluoromethyl)phenyl | *X¹ | *X¹ | H | COOC(CH₃)₃ | *X⁵ | *X⁵ | *X⁵ |
| 173 | Pt | C(CH₃)₃ | *X¹ | *X¹ | *X¹ | COOCH₂CH(CH₃)₂ | *X⁵ | *X⁵ | *X⁵ |
| 174 | VO | CH(CH₃)₂ | *X¹ | *X¹ | *X¹ | COOC₄H₉ | *X⁵ | *X⁵ | *X⁵ |
| 175 | Cu | OC₄H₉ | *X¹ | *X¹ | *X¹ | OC₄H₉ | *X⁵ | *X⁵ | *X⁵ |
| 176 | H₂ | OCH₂C(CH₃)₃ | *X¹ | *X¹ | *X¹ | Cl | *X⁵ | *X⁵ | *X⁵ |
| 177 | Cu | OCH[CH(CH₃)₂]₂ | *X¹ | *X¹ | *X¹ | Cl | *X⁵ | *X⁵ | *X⁵ |
| 178 | AlCl | OCH(CH₃)C(CH₃)₃ | *X¹ | *X¹ | *X¹ | Cl | *X⁵ | *X⁵ | *X⁵ |

TABLE 1-(1)-continued (I)

| Comp. No. | M | X¹ | X² | X³ | X⁴ | X⁵ | X⁶ | X⁷ | X⁸ |
|---|---|---|---|---|---|---|---|---|---|
| 179 | Co | | *X¹ | *X¹ | *X¹ | Br | *X⁵ | *X⁵ | *X⁵ |
| 180 | Zn | ₃-C₆H₃-OMe) | *X¹ | *X¹ | *X¹ | Cl | *X⁵ | *X⁵ | *X⁵ |

*X¹: same as X¹
*X²: same as X²
*X³: same as X³
*X⁵: same as X⁵
*X⁷: same as X⁷

TABLE 1-(2)

(I)

$X^5$ to $X^8 =$ phenyl group with $Y^1$ and $Y^2$ substituents

| Comp. No. | M | $X^1$ to $X^4$ | $Y^1$ | $Y^2$ |
|---|---|---|---|---|
| 181 | Cu | $C_4H_9$ | H | H |
| 182 | Ni | $C_4H_9$ | H | H |
| 183 | Co | $CH_3$ | H | H |
| 184 | Pd | $C_4H_9$ | $CH_3$ | $CH_3$ |
| 185 | Pt | $C_4H_9$ | $C(CH_3)_3$ | H |
| 186 | Fe | $C(CH_3)_3$ | H | H |
| 187 | Mg | $C(CH_3)_3$ | $CH_3$ | $CH_3$ |
| 188 | Zn | $OC_2H_5$ | H | H |
| 189 | VO | $C_4H_9$ | H | H |
| 190 | RhCl | $C_4H_9$ | H | H |
| 191 | $H_2$ | $C_8H_{17}$ | $OCH_3$ | H |
| 192 | $Si(OH)_2$ | $C_4H_9$ | $CH_3$ | H |
| 193 | $Si(OCOC_7H_{15})_2$ | $C_4H_9$ | H | H |
| 194 | $Si[OSi(C_6H_{13})_2]_2$ | $C_2H_5$ | $CH_3$ | H |
| 195 | $Si[OPO(C_6H_5)_2]_2$ | $C_2H_5$ | $C(CH_3)_3$ | H |
| 196 | $Si[OCON(C_4H_9)_2]_2$ | $C_2H_5$ | $C(CH_3)_3$ | H |
| 197 | $Si(OCOCOOC_4H_9)_2$ | $C_2H_5$ | $C(CH_3)_3$ | H |
| 198 | Cu | H | $C(CH_3)_3$ | $C(CH_3)_3$ |
| 199 | Ni | $CH_2OCH_3$ | H | H |
| 200 | Co | $CH_2OCH_3$ | H | H |
| 201 | Pd | $C_4H_9$ | $OCH_3$ | H |
| 202 | Pt | $C_8H_{17}$ | $C(CH_3)_3$ | H |
| 203 | Fe | $C_4H_9$ | $C(CH_3)_3$ | $C(CH_3)_3$ |
| 204 | Zn | $OC_8H_{17}$ | H | H |
| 205 | VO | $C(CH_3)_3$ | $C(CH_3)_3$ | $C(CH_3)_3$ |
| 206 | Cu | $C_4H_9$ | $OCH_3$ | $OCH_3$ |
| 207 | Ni | $C_4H_9$ | Ph | H |
| 208 | Co | $OC_4H_9$ | Ph | H |
| 209 | Zn | $CH_2C(CH_3)_3$ | Ph | H |
| 210 | Cu | $CH_2C(CH_3)_3$ | H | H |
| 211 | Ni | $C_2H_5$ | $OC_4H_9$ | H |
| 212 | Zn | $C_2H_5$ | 2,5-dimethylphenyl | H |
| 213 | $H_2$ | $CH_3$ | 3,5-dimethylphenyl | H |

TABLE 1-(3)

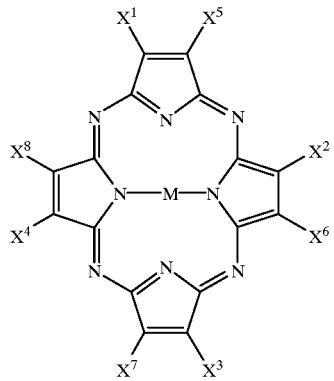

X¹ to X⁴ = CN

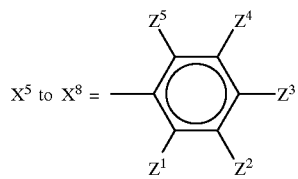

| Comp. No. | Mt | $Z^1$ | $Z^2$ | $Z^3$ | $Z^4$ | $Z^5$ |
|---|---|---|---|---|---|---|
| 214 | Co | CH₃ | H | H | H | H |
| 215 | Cu | CF₃ | H | H | H | H |
| 216 | Zn | H | H | C(CH₃)₃ | H | H |
| 217 | Mg | H | C(CH₃)₃ | H | C(CH₃)₃ | H |
| 218 | Pd | OCH₂CH₃ | H | H | H | H |
| 219 | Ni | H | OCH₃ | OCH₃ | H | H |
| 220 | Fe | CH(CH₃)₂ | H | H | CH₃ | H |
| 221 | Pt | CH₃ | H | H | H | CH₃ |
| 222 | VO | OCH₂CF₂CF₃ | H | H | H | H |
| 223 | RhCl | H | H | (CH₂)₆CH₃ | H | H |
| 224 | H₂ | F | F | F | F | F |
| 225 | Si(OH)₂ | CF₃ | H | H | H | CF₃ |
| 226 | Si(OCOC₇H₁₅)₂ | H | H | CH₂CH(CH₃)₂ | H | H |
| 227 | Si[OSi(C₆H₁₃)₂]₂ | Cl | H | H | H | H |
| 228 | Si[OCON(C₄H₉)₂]₂ | Cl | Cl | Cl | Cl | Cl |
| 229 | Co | F | H | H | H | H |
| 230 | Cu | CN | H | H | H | H |
| 231 | Zn | H | CN | H | H | H |
| 232 | Mg | H | H | NHC₄H₉ | H | H |
| 233 | Pd | H | H | N(C₂H₅)C₃H₇ | H | H |
| 234 | Ni | H | N(C₈H₁₇)₂ | H | H | H |
| 235 | Co | NH₂ | H | H | H | H |
| 236 | Cu | SCH₃ | H | H | H | H |
| 237 | Zn | H | SCH₂CH₂CH₃ | H | H | H |
| 238 | Mg | NO₂ | H | H | H | H |
| 239 | Co | H | NO₂ | H | H | H |
| 240 | Cu | OH | H | H | H | H |
| 241 | Zn | H | H | 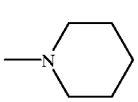 | H | H |
| 242 | Mg | H | H | 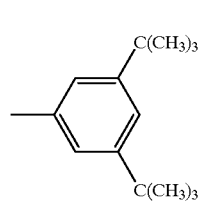 | H | H |

TABLE 1-(3)-continued
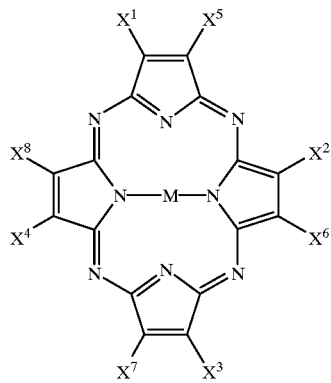
(I)
$X^1$ to $X^4$ = CN
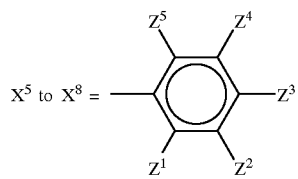
$X^5$ to $X^8$ =
| Comp. No. | Mt | $Z^1$ | $Z^2$ | $Z^3$ | $Z^4$ | $Z^5$ |
|---|---|---|---|---|---|---|
| 243 | Cu | H | (phenyl) | H | H | H |
TABLE 1-(4)
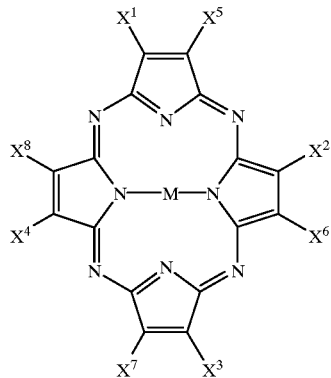
(I)
| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 244 | Ni | —C(CH$_3$)$_3$ | *$X^1$ | *$X^1$ | *$X^1$ | H | H | H | H |
| 245 | Si[OSi(C$_6$H$_{13}$)$_3$]$_2$ | —C$_4$H$_9$ | *$X^1$ | *$X^1$ | *$X^1$ | H | H | H | H |
| 246 | Si(OCOC$_7$H$_{15}$)$_2$ | —CH$_3$ | *$X^1$ | *$X^1$ | *$X^1$ | H | H | H | H |
| 247 | Ge(OC$_4$H$_9$)$_2$ | (phenyl) | *$X_1$ | *$X^1$ | *$X^1$ | H | H | H | H |

TABLE 1-(4)-continued

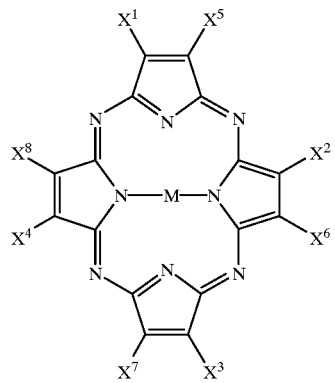
(I)

| Comp. No. | M | X¹ | X² | X³ | X⁴ | X⁵ | X⁶ | X⁷ | X⁸ |
|---|---|---|---|---|---|---|---|---|---|
| 248 | Si[OPO(Ph)₂]₂ | —C₄H₉ | *X¹ | *X¹ | *X¹ | H | H | H | H |
| 249 | VO | —CH₂—C₆H₅ (benzyl) | *X¹ | *X¹ | *X¹ | H | H | H | H |
| 250 | Si(OCOCOOC₄H₉)₂ | —C₆H₄—CH₃ (tolyl) | *X₁ | *X¹ | *X¹ | H | H | H | H |
| 251 | Si(OCOCOC₄H₉)₂ | —OCH₃ | *X¹ | *X¹ | *X¹ | H | H | H | H |
| 252 | Si[OCON(C₄H₉)₂]₂ | —OC₄H₉ | *X¹ | *X¹ | *X¹ | H | H | H | H |
| 253 | Co | —C₆H₄—C(CH₃)₃ | *X¹ | *X¹ | *X¹ | *X¹ | *X¹ | *X¹ | *X¹ |
| 254 | Ni | —SCH₂—C₆H₅ | *X¹ | *X¹ | *X¹ | *X¹ | *X¹ | *X¹ | *X¹ |
| 255 | Cu | —SC₂H₅ | *X¹ | *X¹ | *X¹ | *X¹ | *X¹ | *X¹ | *X¹ |
| 256 | Si(OH)₂ | —O—C₆H₃(CH₃)₂ | *X₁ | *X¹ | *X¹ | *X¹ | *X¹ | *X¹ | *X¹ |
| 257 | Mg | 1-methylnaphthyl | *X¹ | *X¹ | *X¹ | *X¹ | *X¹ | *X¹ | *X¹ |
| 258 | Fe | —CH₃ | *X¹ | *X¹ | *X¹ | *X¹ | *X¹ | *X¹ | *X¹ |
| 259 | Co | —C₄H₉ | *X¹ | *X¹ | *X¹ | *X¹ | *X¹ | *X¹ | *X¹ |
| 260 | Pd | —OC₈H₁₇ | *X¹ | *X¹ | *X¹ | *X¹ | *X¹ | *X¹ | *X¹ |
| 261 | Mn | —CH₂OC₄H₉ | *X¹ | *X¹ | *X¹ | *X¹ | *X¹ | *X¹ | *X¹ |

*X¹: same as X¹

TABLE 2

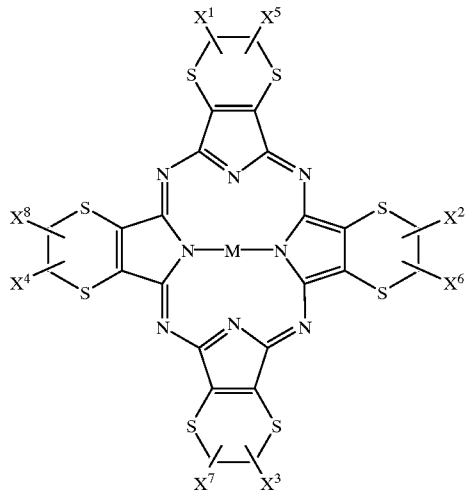

(II)

| Comp. No. | M | $X^1$ | $X^2$ | $X^3$ | $X^4$ | $X^5$ | $X^6$ | $X^7$ | $X^8$ |
|---|---|---|---|---|---|---|---|---|---|
| 53 | Cu | —CH$_3$ | *X$^1$ | *X$^1$ | *X$^1$ | H | *X$^5$ | *X$^5$ | *X$^5$ |
| 54 | Si(OH)$_2$ | —C$_2$H$_5$ | *X$^1$ | *X$^1$ | *X$^1$ | H | *X$^5$ | *X$^5$ | *X$^5$ |
| 55 | Co | —C$_8$H$_{17}$ | *X$^1$ | *X$^1$ | *X$^1$ | H | *X$^5$ | *X$^5$ | *X$^5$ |
| 56 | Zn | —C$_2$H$_5$ | *X$^1$ | *X$^1$ | *X$^1$ | —CH$_3$ | *X$^5$ | *X$^5$ | *X$^5$ |

*X$^1$: same as X$^1$
*X$^5$: same as X$^5$
*X$^7$: same as X$^7$

In the compound of the formula (I), when $X^5$ to $X^8$ are each a halogen atom, the wavelength of the absorption light therefor is shifted to a longer wavelength side, so that such compound is particularly suitable for use as a recording material for the recording layer of the information recording medium of the present invention, the wavelength control for the information recording medium is easy.

For instance, when a laser beam with a wavelength of about 635 nm is employed for recording and reproduction, it is preferable that X in the formula (I) be Pd, Ni, Co, Pt, Cu, Zn or VO. This in because such compounds have lower thermal decomposition temperatures, and therefore the pyrolysis thereof can take place rapidly. Thus, the shapes of recording pits formed are sharp and the recording medium with such sharp recording pits exhibits excellent recording and reproduction characteristics.

However, the compounds of the formula (T) in which $X^5$ to $X^8$ are each a halogen atom exhibit slight solubility in solvents and therefore are difficult to use in a conventional coating method using a solvent for the formation of the recording layer. Therefore it is preferable to use the above-mentioned compound with $X^5$ to $X^8$ being each a halogen atom (hereinafter referred to as the halogen-substituted compound (I)) in combination with the compound of the formula (I) in which $X^5$ to $X^8$ are not a halogen atom (hereinafter referred to as the non-halogen-substituted compound (I)) when forming the recording layer by the coating method.

Furthermore, by using the halogen-substituted compound (I) and the non-halogen-substituted compound (I) in combination, the wavelength range of the laser beam for the recording and reproduction can be expanded.

It is preferable that the ratio of the amount by weight of the halogen-substituted compound (I) to the non-halogen-substituted compound (I) be in a range of 1 to 99:99 to 1, more preferably in a range of 20 to 80:80 to 20.

When the halogen-substituted compound (I) is used alone, the solvent solubility thereof will have to be adjusted by selecting appropriate $X^1$ to $X^4$. For this purpose, it is preferable that $X^1$ to $X^4$ be an alkyl group having 5 or more carbon atoms, since such compounds are suitable for use in the formation of the recording layer by the coating method on a substrate formed by injection molding.

Furthermore, a bromine atom is preferable as a halogen atom for $X^5$ to $X^8$ in view of the fact that the synthesis of the compound is easy and excellent recording and reproduction characteristics can be obtained when used in the information recording medium of the present invention.

As mentioned above, a CD-R recording medium which can be employed, not only for the current CD-R disk system, but also for a high density disk system for the next generation, can be provided by using the recording layer which comprises at least one of the compound of the formula (I) or the compound of the formula (II), and at least one organic dye having a maximum absorption wavelength in the range of 680 nm to 750 nm in combination. Preferable examples of such organic dyes having a maximum absorption wavelength in the range of 680 nm to 750 nm are a pentamethylene cyanine dye, a phthalocyanine dye and an azo metal chelate dye.

A preferable example of the pentamethylene cyanine dye is a pentamethylene cyanine dye having the following formula (III):

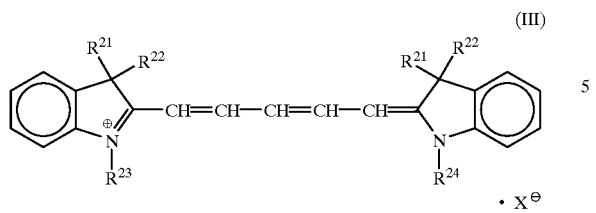
(III)

wherein $R^{21}$ and $R^{22}$ are each independently an alkyl group having 1 to 3 carbon atoms, $R^{23}$ and $R^{24}$ are each independently an unsubstituted or substituted alkyl group having 1 to 6 carbon atoms, X is an acid anion, and the aromatic group may be condensed with other aromatic ring, and may have a substituent selected from the group consisting of an alkyl group, a halogen atom, an alkoxyl group, and an acyl group.

Preferable examples of the phthalocyanine dye are a phthalocyanine dye of formula (IV) and a phthalocyanine dye of formula (V) an follows:

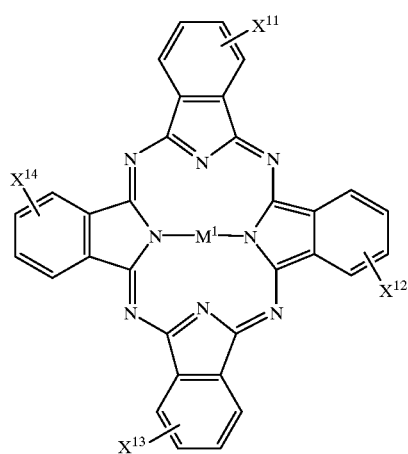
(IV)

wherein $M^1$ is a metal or a metal oxide selected from the group consisting of Ni, Pd, Cu, Zn, Co, Mn, Fe, TiO and VO, $X^{11}$ to $X^{14}$ are each independently —OR or —SR, wherein R is an unsubstituted or substituted, straight-chain or branched, or alicyclic alkyl group having 3 to 12 carbon atoms, or an unsubstituted or substituted aryl group, with $X^{11}$ to $X^{14}$ being substituted at α-position of each benzene ring bonded thereto, provided that each benzene ring may have as a substituent a hydrogen atom or a halogen atom except at the α-position for the substitution of $X^{11}$ to $X^{14}$.

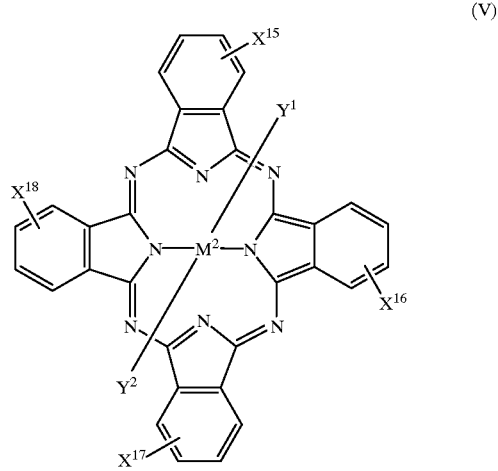
(V)

wherein $M^2$ is a metal selected from the group consisting of Si, Ge, In and Sn, $X^{15}$ to $X^{18}$ are each independently —OR or —SR, wherein R is an unsubstituted or substituted, straight-chain or branched, or alicyclic alkyl group having 3 to 12 carbon atoms, or an unsubstituted or substituted aryl group, with $X^{15}$ to $X^{18}$ being substituted at α-position of each benzene ring bonded thereto, provided that each benzene ring may have as a substituent a hydrogen atom or a halogen atom except at the α-position for the substitution of $X^{15}$ to $X_{18}$, and $Y^1$ and $Y^2$ are each independently —$OSiR^{25}R^{26}R^{27}$, —$OCOR^{25}R^{26}R^{27}$ or —$OPOR^{25}R^{26}R^{27}$, wherein $R^{25}R^{26}$ and $R^{27}$ are each independently an alkyl group having 1 to 10 carbon atoms or an aryl group.

Preferable examples of the azo metal chelate dye are azo metal chelate compounds prepared from an azo compound of the following formula (VI) and a metal. Preferable examples of the metal are Ni, Pt, Pd, Co, Cu and Zn.

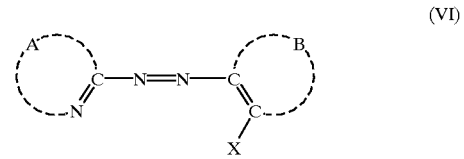
(VI)

wherein A is a residue which is capable of forming a heterocyclic ring in combination with the carbon atom and the nitrogen atom to which A is bonded, B is a residue which is capable of forming an aromatic ring or a heterocyclic ring in combination with the two carbon atoms to which B is bonded, and X is a group having an active hydrogen atom.

When at least one of the compound of the formula (I) or the compound of the formula (II), and at least one organic dye selected from the above-mentioned organic dyes of formulae (III) to (V) and the dye prepared from the azo compound of formula (VI) are used in combination for the recording layer, it is preferable that the mixing ratio by weight of at least one of the compound of the formula (I) or the compound of the formula (II), and at least one of the above-mentioned organic dyes be in the range of 10:100 to 90:100, more preferably in the range of 40:100 to 20:100.

It is preferable that the thus prepared recording layer have a thickness in the range of 500 Å to 5 μm, more preferably in the range of 1000 Å to 5000 Å.

FIGS. 1(a) to 1(d) show schematic cross sectional views of examples of an information recording medium of the present invention, which can be used for a write once read many type optical disk.

The information recording medium of the present invention shown in FIG. 1(a) comprises a substrate 1 and a recording layer 2 which is provided on the substrate 1.

Figure 1B:
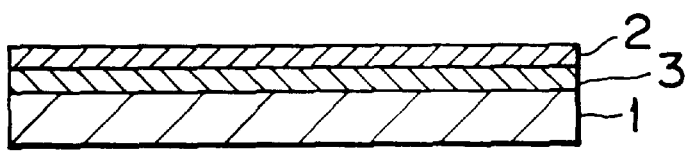

The information recording medium of the present invention shown in FIG. 1(b) is the same as the information recording medium shown in FIG. 1(a) except that an undercoat layer 3 is interposed between the substrate 1 and the recording layer 2.

Figure 1C:
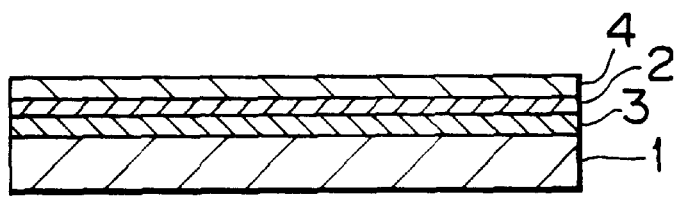

The information recording medium of the present invention shown in FIG. 1(c) is the same as the information recording medium shown in FIG. 1(b) except that a protective layer 4 is overlaid on the recording layer 2.

Figure 1D:
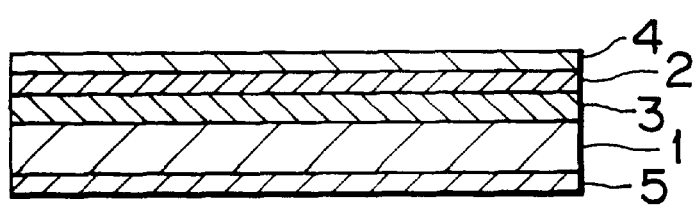

The information recording medium of the present invention shown in FIG. 1(d) is the same as the information recording medium shown in FIG. 1(c) except that a hard coat layer 5 is provided on the lower side of the substrate 1 opposite to the recording layer 2.

Figure 2A:
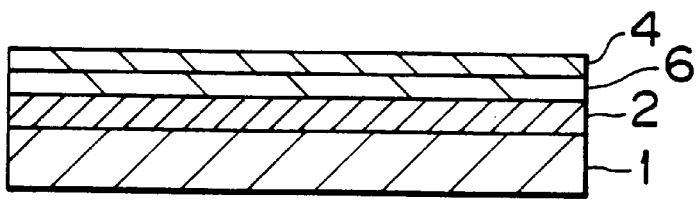
FIGS. 2(a) to 2(c) are schematic cross-sectional views of examples of another optical information recording medium according to the present invention.
Figure 2B:
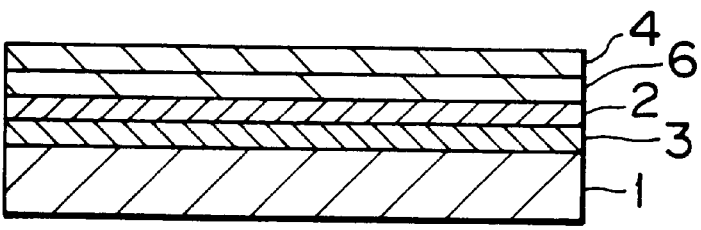
Figure 2C:
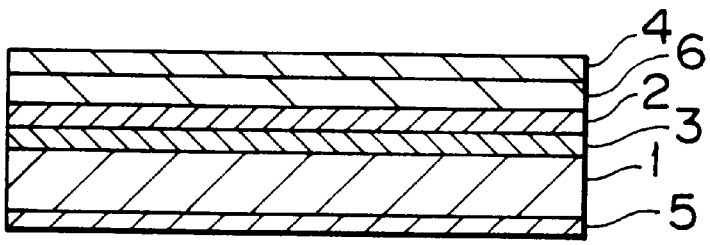

FIGS. 2(a) to 2(c) show schematic cross sectional views of examples of an information recording medium of the present invention, which can be used for a CD-R media.

The information recording medium of the present invention shown in FIG. 2(a) comprises a substrate 1, a recording layer 2 which is provided on the substrate 1, a reflection layer 6 which is provided on the recording layer 2, and a protective layer 4 which is provided on the reflection layer 6.

The information recording medium of the present invention shown in FIG. 2(b) is the same as the information recording medium shown in FIG. 2(a) except that an undercoat layer 3 is interposed between the substrate 1 and the recording layer 2.

The information recording medium of the present invention shown in FIG. 2(c) is the same as the information recording medium shown in FIG. 2(b) except that a hard coat layer 5 is provided on the lower side of the substrate 1 opposite to the recording layer 2.

FIGS. 3(a) and 3(b) are schematic cross-sectional views of examples of a further optical information recording medium according to the present invention.

The information recording medium shown in FIG. 3(a) is the same as the information recording medium shown in FIG. 2(a) except that an adhesive layer 8 and a protective substrate 7 are further overlaid in this order on the protective layer 4.

The information recording medium shown in FIG. 3(b) is the same as the information recording medium shown in FIG. 2(c) except that the adhesive layer 8 and the protective substrate 7 are further overlaid in this order on the protective layer 4.

An information recording medium of the present invention can also be constructed by superimposing any two of the above-mentioned recording media in such a manner that the recording layers of the two recording media are positioned inside so as to face each other with an air gap therebetween in a sealed air-sandwich structure, or by pasting the two recording media in the above-mentioned posture, but through the protective layer.

Required properties or characteristics and materials for each of the above-mentioned layers of the information recording medium of the present invention will now be explained.

(1) Substrate

When recording and reproduction are carried out at the substrate side, it is required that the substrate be transparent to the laser beam employed for the recording and reproduction. However, such transparency is unnecessary when recording and reproduction are carried out at the recording layer side.

Examples of the material for the substrate are plastics such as polyester, acrylic resin, polyamide, polycarbonate resin, polyolefin resin, phenol resin, epoxy resin, polyimide; glass; ceramics, and metals. Guide grooves or guide bits for tracking may be formed on the surface of the substrate. Furthermore, preformats for address signals and the like may also be formed on the surface of the substrate.

(2) Recording Layer

Information is recorded in the recording layer by forming some optical changes in the recording layer by the recording layer being irradiated with laser beams. According to the present invention, it is required that any of the compounds of formula (I) or formula (II), optionally at least one organic dye selected from the organic dyes of formulae (III) to (V) and the dye prepared from the azo compound of formula (VI), be contained in this recording layer. These dyes can also be used in combination with other organic pigments, metals or metal compounds in the form of a mixture or the form of overlaid layers, in order to improve the optical characteristics, recording sensitivity and signal characteristics of the recording layer. Examples of the above-mentioned other organic pigments are polymethine dyes, naphthalocyanine dyes, phthalocyanine dyes, squarylium dyes, croconium dyes, pyrylium dyes, naphthoquinone dyes anthraquinone (indanthrene) dyes, xanthene dyes, triphenylmethane dyes, azulene dyes, tetrahydrocholine dyes, phenanthrene dyes, triphenothiazine dyes, or metal complex compounds.

Examples of the above-mentioned metals and metal compounds are In, Te, Bi, Se, Sb, Ge, Sn, Al, Be, As, Cd, $TeO_2$ and SnO. These metals and metal compounds can be used in the form of a dispersed mixture or in the form of overlaid layers.

The above-mentioned dyes can also employed in combination with various materials, for example, polymers such as ionomer resin, polyamide resin, polyvinyl resin, natural polymers, silicone and liquid rubber, and a silane coupling agent, in the form of a dispersed mixture.

Furthermore, in order to improve the characteristics of the recording layer, the above-mentioned dyes may also be employed in combination with other agents such as a stabilizer (for example, a transition metal complex), a dispersant, a fire retardant, a lubricant, an antistatic agent, a surfactant, and a plasticizer.

The recording layer can be formed by any of conventional methods such as sputtering, CVD and solvent coating The coating method is carried out by dissolving any of the above-mentioned compounds, dyes and other materials in an organic solvent to prepare a coating liquid, and a recording layer is formed by coating, for instance, the substrate with the coating liquid by a conventional coating method such as spray coating, roller coating, dipping, or spinner coating.

Specific examples of the organic solvent are alcohols such as methanol, ethanol and isopropanol; ketones such as acetone, methyl ethyl ketone and cyclohexanone; amides such as N,N-dimethylacetamide and N,N- dimethylformamide; sulfoxide such as dimethylsulfoxide; ethers such as tetrahydrofuran, dioxane, diethyl other and ethylene glycol monomethyl other; esters such as methyl acetate and ethyl acetate; aliphatic carbon halides such as chloroform, methyl chloride, dichloroethane, carbon tetrachloride and trichloroethane; aromatic compounds such an benzene, xylene, monochlorobenzene and dichlorobenzene; and hydrocarbons such as hexane, pentane, cyclohexane and methylcyclohexane.

It is preferable that the recording layer for the optical information recording media of the present invention have a thickness in the range of 100 Å to 10 μm, more preferably in the range of 200 Å to 5000 Å.

(3) Undercoat Layer

The undercoat layer is formed between the substrate and the recording layer for the following purposes: (a) improving the adhesion strength between the substrate and the recording layer; (b) preventing the recording layer from being exposed to water and gases as a barrier layer; (c) improving the preservation stability of the recording layer; (d) increasing the reflectance of the recording layer; (e) protecting the substrate from the solvent employed; and (f) forming guide grooves, guide pits and pregrooves and the like.

To attain the above-mentioned purpose (a), a variety of polymeric materials such as ionomer resin, polyamide resin, vinyl resin, natural resins, natural polymeric materials, silicone and liquid rubber; and a silane coupling agent may be employed.

To attain the purposes (b) and (c), inorganic compounds such as $SiO_2$, $MgF_2$, SiO, $TiO_2$, ZnO, TiN and SiN; and metals such as Zn, Cu, Ni, Cr, Ge, Se, Au, Ag and Al and semimetals can be used in addition to the above-mentioned polymeric materials.

To attain the purpose (d), a metal such as Al or Ag may be used in the undercoat layer; or an organic thin film exhibiting metallic luster which comprises, for example, methine dye or xanthene dye, can be used as the undercoat layer.

To attain the purposes (e) and (f), an ultraviolet-curing resin, a thermosetting resin and a thermoplastic resin can be used in the undercoat layer.

It is preferable that the undercoat layer have a thickness in the range of 0.01 to 30 μm, more preferably in the range of 0.05 to 10 μm.

(4) Reflection Layer

The reflection layer for use in the present invention can be made of a metal made of a single substance and/or a semimetal, which has high reflectivity and is difficult to be corroded.

Specific examples of the metal are Au, Ag, Cu, Al, Cr and Ni. Of these metals, Au and Al are particularly preferable for use in the present invention in view of the reflectivity and productivity. These metals can be used alone or in combination, or in the form of alloys.

A semimetal such as An, Sb and Bi can also be used for the reflection layer alone or in combination or in the form of alloys with any of the above-mentioned metals.

The reflection layer can be formed by a conventional film formation method such as vacuum deposition or sputtering. It is preferable that the reflection layer have a thickness in the range of 50 to 5000 Å, more preferably in the range of 100 to 3000 Å.

(5) Protective Layer and Hard Coat Layer

The protective layer is provided (a) to protect the recording layer from damage, dust, soiling and the like, (b) to improve the storage stability of the recording layer, and (c) to improve the reflectivity, and the hard coat layer is provided to protect the opposite surface of the substrate to the recording layer from damage, dust, soiling and the like.

For these purposes, the same materials as used for the undercoat layer can be used in the protective layer and the hard coat layer.

As inorganic materials, for instance, SiO and $SiO_2$ can be employed. As organic materials, there can be employed heat-softening or heat-fusible resins such as acrylic resin, polycarbonate, epoxy rosin, polystyrene, polyester resin, vinyl resin, cellulose, aliphatic hydrocarbon resin, aromatic hydrocarbon rosin, natural rubber, styrene-butadiene resin, chloroprene rubber, wax, alkyed resin, drying oil, rosin, and ultraviolet-curing resin.

Of the above-mentioned resins, ultraviolet-curing resin is most preferable for use in the protective layer and also for the hard coat layer, since the ultraviolet-curing resin is excellent in productivity.

It is preferable that the protective layer and the hard coat layer have a thickness in the range of 0.01 to 30 μm, more preferably in the range of 0.05 to 10 μm.

In the present invention, auxiliary agents such as a stabilizer, a dispersant, a fire retardant, a lubricant, an antistatic agent, a surfactant, and a plasticizer can be contained in the above-mentioned undercoat layer, protective layer and hard coat layer in the same manner as in the case of the recording layer.

EXAMPLE 1

[Fabrication of Optical Information Recording Medium]

A guide groove with a depth of 1200 Å, a half width of 0.4 μm and a track pitch of 1.4 μm was formed on a photopolymer provided on a polymethyl methacrylate disk with a thickness of 1.2 mm, whereby a substrate was prepared.

Compound No. 4 shown in TABLE 1-(1) was dissolved in 1,2-dichloroethane, and the thus obtained solution of compound No. 4 was applied to the above prepared substrate by spinner coating, whereby a recording layer with a thickness of 800 Å was provided on the substrate.

Thus, an optical information recording mediam No. 1 according to the present invention was fabricated.

EXAMPLES 2 to 8

[Fabrication of Optical Information Recording Media]

The procedure for fabrication of the optical information recording medium No. 1 in Example 1 was repeated except that compound No. 4 employed in Example 1 was replaced by compounds No. 5, No. 6, No. 7, No. 9, No. 12, No. 14 and No. 16 shown in TABLE 1-(1), respectively in Examples 2 to 8.

Thus, optical information recording media Nos. 2 to 8 according to the present invention were fabricated.

Comparative Example 1

[Fabrication of Optical Information Recording Medium]

The procedure for fabrication of the optical information recording medium No. 1 in Example 1 was repeated except that compound No. 4 employed in Example 1 was replaced by the following compound of formula (a), whereby a comparative optical information recording medium No. 1 was fabricated.

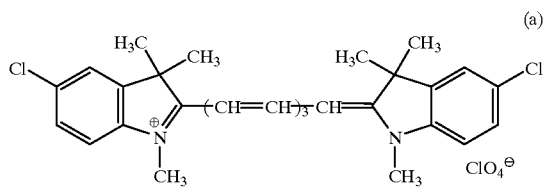

To evaluate the recording characteristics of each of the above prepared optical information recording media Nos. 1 to 8 according to the present invention and comparative optical information recording medium No. 1, information was recorded by applying a laser beam with a wavelength of 680 nm to the substrate side of each recording medium, under the conditions that the recording frequency was 1.25 MHZ, and the recording linear speed was 1.2 m/sec.

Using the same laser as employed in the above, a continuous wave laser beam having a reproduction power of 0.25 to 0.3 mW was applied to each recording medium to reproduce the recorded information, and the light reflected from the recording medium was detected. The detected light was subjected to a spectral analysis, using a scanning filter at a band width of 30 kHz, so that the initial C/N (carrier/noise) ratio was obtained.

Further, the reflectance (initial value) of a non-recorded portion on the guide groove was also measured by using the same laser beams.

The results are shown in TABLE 3-(1).

Each recording medium was caused to deteriorate by exposing it to the light of a xenon lamp of 40,000 lux for 50 hours. After the exposure, the reflectance and the C/N ratio of each recording medium were measured in the same manner as in the above. The results are also shown in TABLE 3-(1).

Each recording medium was caused to deteriorate by allowing it to stand at 85° C., 85% RH for 720 hours, and then the reflectance and the C/N ratio of each recording medium were measured in the same manner as in the above. The results are also shown in TABLE 3-(1).

TABLE 3-(1)

| Example No. | Compound No. | Initial Values Reflectance (%) | Initial Values C/N (dB) | After Exposure to Xe lamp for 50 hrs. Reflectance (%) | After Exposure to Xe lamp for 50 hrs. C/N (dB) | After storage at 85° C., 85% RH for 720 hrs. Reflectance (%) | After storage at 85° C., 85% RH for 720 hrs. C/N (dB) |
|---|---|---|---|---|---|---|---|
| 1 | 4 | 26 | 51 | 21 | 48 | 24 | 49 |
| 2 | 5 | 25 | 51 | 20 | 47 | 23 | 49 |
| 3 | 6 | 26 | 50 | 21 | 48 | 23 | 48 |
| 4 | 7 | 27 | 51 | 20 | 47 | 24 | 49 |
| 5 | 9 | 24 | 50 | 19 | 48 | 21 | 48 |
| 6 | 12 | 25 | 51 | 20 | 49 | 23 | 49 |
| 7 | 14 | 24 | 49 | 20 | 48 | 22 | 48 |
| 8 | 16 | 25 | 50 | 20 | 47 | 21 | 48 |
| Comp. Ex. No. 1 | a | 11 | — | 7 | — | 9 | — |

Note:
"—" denotes that the measurement was impossible.

EXAMPLE 9
[Fabrication of Optical Information Recording Medium]

A guide groove with a depth of 1200 Å, a half width of 0.35 μm and a track pitch of 1.0 μm was formed on a photopolymer provided on a polymethyl methacrylate disk with a thickness of 1.2 mm, whereby a substrate was prepared.

Compound No. 33 shown in TABLE 1-(1) was dissolved in 1,2-dichloroethane, and the thus obtained solution of compound No. 33 was applied to the above prepared substrate by spinner coating, whereby a recording layer with a thickness of 800 Å was provided on the substrate.

Thus, an optical information recording medium No. 9 according to the present invention was fabricated.

EXAMPLES 10 to 16
[Fabrication of Optical Information Recording Media]

The procedure for fabrication of the optical information recording medium No. 9 in Example 9 was repeated except that compound No. 33 employed in Example 9 was replaced by compounds No. 35, No. 34, No. 36, No. 39, No. 42, No. 26 and No. 29 shown in TABLE 1-(1), respectively in Examples 10, 11, 12, 13, 14, 15 and 16.

Thus, optical information recording media Nos. 10 to 16 according to the present invention were fabricated.

Comparative Example 2
[Fabrication of Optical Information Recording Media]

The procedure for fabrication of the optical information recording medium No. 9 in Example 9 was repeated except that compound No. 33 employed in Example 9 was replaced by the compound of formula (a) employed in Comparative Example 1, whereby a comparative optical information recording medium No. 2 was fabricated.

EXAMPLE 17
[Fabrication of Optical Information Recording Medium]

A guide groove with a depth of 1200 Å, a half width of 0.35 μm and a track pitch of 1.0 μm was formed on a photopolymer provided on a polymethyl methacrylate disk with a thickness of 1.2 mm, whereby a substrate was prepared.

Compound No. 97 shown in TABLE 1-(1) was dissolved in 1,2-dichloroethane, and the thus obtained solution of compound No. 97 was applied to the above prepared substrate by spinner coating, whereby a recording layer with a thickness of 900 Å was provided on the substrate.

Thus, an optical information recording medium No. 17 according to the present invention was fabricated.

EXAMPLES 18 to 64
[Fabrication of Optical Information Recording Media]

The procedure for fabrication of the optical information recording medium No. 17 in Example 17 was repeated except that compound No. 97 employed in Example 17 was replaced by compounds No. 93, No. 94, No. 98, No. 99, No. 100, No. 107, No. 109 in TABLE 1-(1), No. 188, No. 189, No. 190, No. 194, No. 197, No. 181, No. 184 in TABLE 1-(2), No. 180, No. 57, No. 59, No. 61, No. 67, No. 71, No. 72, No. 75, No. 77, No. 119, No. 122, No. 125, No. 128, No. 130, No. 134, No. 136, No. 143 in TABLE 1-(1), No. 214, No. 216, No. 217, No. 218, No. 219, No. 224, No. 225, No. 226 in TABLE 1-(3), No. 150, No. 151, No. 157, No. 160, No. 162, No. 166, No. 174 and No. 178 in TABLE 1-(1), respectively in Examples 18 to 64.

Thus, optical information recording media Nos. 18 to 64 according to the present invention were fabricated.

The recording characteristics of each of the above prepared optical information recording media Nos. 9 to 64 according to the present invention and comparative optical information recording medium No. 2 were evaluated in the same manner as in Example 1 except that in Examples 9 to 64 and Comparative Example 2, a laser beam with a wavelength of 650 nm was employed instead of the laser beam with a wavelength of 680 nm employed in Example 1.

The results are shown in TABLE 3-(2).

TABLE 3-(2)

| Example No. | Compound No. | Initial Values Reflectance (%) | Initial Values C/N (dB) | After Exposure to Xe lamp for 50 hrs. Reflectance (%) | After Exposure to Xe lamp for 50 hrs. C/N (dB) | After storage at 85° C., 85% RH for 720 hrs. Reflectance (%) | After storage at 85° C., 85% RH for 720 hrs. C/N (dB) |
|---|---|---|---|---|---|---|---|
| 9 | 33 | 26 | 52 | 24 | 50 | 24 | 50 |
| 10 | 35 | 27 | 52 | 25 | 50 | 24 | 49 |
| 11 | 34 | 26 | 50 | 25 | 50 | 25 | 49 |
| 12 | 36 | 26 | 52 | 25 | 52 | 25 | 51 |
| 13 | 39 | 27 | 51 | 27 | 51 | 27 | 51 |
| 14 | 42 | 27 | 52 | 26 | 52 | 26 | 51 |
| 15 | 26 | 26 | 49 | 26 | 49 | 26 | 49 |
| 16 | 29 | 25 | 50 | 25 | 49 | 25 | 49 |
| 17 | 97 | 26 | 52 | 24 | 51 | 24 | 51 |
| 18 | 93 | 25 | 50 | 24 | 50 | 23 | 50 |
| 19 | 94 | 25 | 49 | 24 | 49 | 24 | 49 |
| 20 | 98 | 26 | 52 | 25 | 52 | 25 | 51 |
| 21 | 99 | 27 | 51 | 27 | 51 | 27 | 51 |
| 22 | 100 | 27 | 52 | 26 | 52 | 26 | 51 |
| 23 | 107 | 26 | 51 | 26 | 51 | 26 | 50 |
| 24 | 109 | 25 | 51 | 25 | 51 | 25 | 51 |
| 25 | 188 | 26 | 52 | 24 | 50 | 24 | 50 |
| 26 | 189 | 27 | 52 | 25 | 50 | 24 | 49 |
| 27 | 190 | 26 | 50 | 25 | 50 | 25 | 48 |
| 28 | 194 | 25 | 52 | 26 | 52 | 25 | 51 |
| 29 | 197 | 27 | 51 | 27 | 51 | 27 | 51 |
| 30 | 181 | 26 | 52 | 26 | 52 | 26 | 51 |
| 31 | 184 | 26 | 49 | 26 | 48 | 26 | 49 |
| 32 | 180 | 25 | 50 | 25 | 49 | 25 | 49 |
| 33 | 57 | 27 | 53 | 27 | 52 | 27 | 51 |
| 34 | 59 | 26 | 50 | 26 | 50 | 26 | 50 |
| 35 | 61 | 26 | 50 | 24 | 50 | 25 | 50 |
| 36 | 67 | 25 | 52 | 24 | 52 | 25 | 52 |
| 37 | 71 | 26 | 51 | 25 | 50 | 24 | 51 |
| 38 | 72 | 27 | 52 | 26 | 52 | 26 | 51 |
| 39 | 75 | 26 | 51 | 26 | 51 | 26 | 50 |
| 40 | 77 | 26 | 51 | 25 | 51 | 25 | 51 |
| 41 | 119 | 27 | 53 | 26 | 52 | 23 | 51 |
| 42 | 122 | 26 | 52 | 25 | 51 | 25 | 50 |
| 43 | 125 | 25 | 51 | 24 | 50 | 25 | 50 |
| 44 | 128 | 25 | 52 | 24 | 52 | 25 | 51 |
| 45 | 130 | 26 | 51 | 25 | 50 | 24 | 51 |
| 46 | 134 | 26 | 52 | 25 | 51 | 25 | 51 |
| 47 | 136 | 26 | 51 | 26 | 51 | 25 | 50 |
| 48 | 143 | 26 | 51 | 25 | 51 | 25 | 51 |
| 49 | 214 | 27 | 51 | 27 | 51 | 26 | 52 |
| 50 | 216 | 26 | 50 | 27 | 52 | 24 | 51 |
| 51 | 217 | 25 | 51 | 27 | 51 | 23 | 50 |
| 52 | 218 | 26 | 50 | 26 | 52 | 25 | 52 |
| 53 | 219 | 26 | 51 | 25 | 51 | 24 | 52 |
| 54 | 224 | 25 | 52 | 24 | 50 | 24 | 50 |
| 55 | 225 | 26 | 50 | 25 | 51 | 25 | 49 |
| 56 | 226 | 24 | 51 | 24 | 49 | 25 | 50 |
| 57 | 150 | 27 | 52 | 26 | 52 | 26 | 51 |
| 58 | 151 | 26 | 53 | 25 | 52 | 26 | 50 |
| 59 | 157 | 25 | 51 | 24 | 50 | 25 | 50 |
| 60 | 160 | 25 | 52 | 24 | 52 | 25 | 51 |
| 61 | 162 | 26 | 51 | 25 | 51 | 25 | 51 |
| 62 | 166 | 26 | 52 | 25 | 51 | 25 | 51 |
| 63 | 174 | 26 | 51 | 25 | 51 | 25 | 50 |
| 64 | 178 | 26 | 51 | 25 | 51 | 25 | 51 |
| Comp. Ex. No. 2 | a | 11 | — | 7 | — | 9 | — |

Note:
"—" denotes that the measurement was impossible.

EXAMPLE 65
[Fabrication of Optical Information Recording Medium]

A guide groove with a depth of 1000 Å, a half width of 0.45 μm and a track pitch of 1.6 μm was formed on an injection-molded polycarbonate disk with a thickness of 1.2 mm, whereby a substrate was prepared.

Compound No. 4 shown in TABLE 1-(1) was dissolved in a mixed solvent of methylcyclohexane, 2-methoxyethanol, methyl ethyl ketone and tetrahydrofuran, and the thus obtained solution of compound No. 4 was applied to the above prepared substrate by spinner coating, whereby a recording layer with a thickness of 1800 Å was provided on the substrate.

On the thus provided recording layer, a reflection layer of Au with a thickness of 2000 Å was provided by sputtering.

A protective layer made of an acrylic photopolymer with a thickness of 5 μm was formed on the reflection layer.

Thus, an optical information recording medium No. 65 according to the present invention was fabricated.

EXAMPLES 66 to 72
[Fabrication of Optical Information Recording Media]

The procedure for fabrication of the optical information recording medium No. 65 in Example 65 was repeated except that compound No. 4 employed in Example 65 was replaced by compounds No. 5, No. 6, No. 7, No. 16, No. 17, No. 20 and No. 21 in TABLE 1-(1), respectively in Examples 66 to 72.

Thus, optical information recording media Nos. 66 to 72 according to the present invention were fabricated.

Comparative Example 3
[Fabrication of Optical Information Recording Medium]

The procedure for fabrication of the optical information recording medium No. 65 in Example 65 was repeated except that compound No. 4 employed in Example 65 was replaced by the compound of formula (a) employed in Comparative Example 1, whereby a comparative optical information recording medium No. 3 was fabricated.

To evaluate the recording characteristics of each of the above prepared optical information recording media Nos. 65 to 72 according to the present invention and comparative optical information recording medium No. 3, EFM signals were recorded by applying a semiconductor laser beam with a wavelength of 680 nm and a beam diameter of 1.4 μm to each recording medium, while tracking was conducted, under the condition that the recording linear speed was set at 1.4 m/sec. Thus, the reproduction waveform(initial) obtained from each recording medium was inspected.

Further, the reflectance (initial value) of a non-recorded portion on the guide groove was also measured by using the same laser beams.

The results are shown in TABLE 4.

Each recording medium was caused to deteriorate by exposing it to the light of a xenon lamp of 40,000 lux for 50 hours. After the exposure, the reproduction waveform obtained from each recording medium was inspected in the same manner as mentioned above. Furthermore, the reflectance of each recording medium was measured in the same manner as mentioned above.

The results are also shown in TABLE 4.

TABLE 4

| Example No. | Comp. No. | Initial Values Reflectance (%) | Initial Values Reproduction Waveform | After Exposure to Xe lamp for 50 hrs. Reflectance (%) | After Exposure to Xe lamp for 50 hrs. Reproduction Waveform |
|---|---|---|---|---|---|
| 65 | 4 | 72 | ○ | 71 | ○ |
| 66 | 5 | 71 | ○ | 70 | ○ |
| 67 | 6 | 72 | ○ | 70 | ○ |
| 68 | 7 | 74 | ○ | 72 | ○ |

TABLE 4-continued

| Example No. | Comp. No. | Initial Values | | After Exposure to Xe lamp for 50 hrs. | |
|---|---|---|---|---|---|
| | | Reflectance (%) | Reproduction Waveform | Reflectance (%) | Reproduction Waveform |
| 69 | 16 | 73 | ○ | 72 | ○ |
| 70 | 17 | 73 | ○ | 71 | ○ |
| 71 | 29 | 74 | ○ | 72 | ○ |
| 72 | 20 | 72 | ○ | 71 | ○ |
| Comp. Ex. No. 3 | a | 5 | — | 5 | — |

Note:
"○" denotes that the reproduction waveform was clear.
"—" denotes that the measurement was impossible.

EXAMPLE 73

[Fabrication of Optical Information Recording Medium]

A guide groove with a depth of 1000 Å, a half width of 0.35 μm and a track pitch of 1.0 μm was formed on an injection-molded polycarbonate disk with a thickness of 1.2 mm, whereby a substrate was prepared.

Compound No. 91 shown in TABLE 1-(1) was dissolved in a mixed solvent of methylcyclohexane, 2-methoxyethanol, methyl ethyl ketone and tetrahydrofuran, and the thus obtained solution of compound No. 91 was applied to the above prepared substrate by spinner coating, whereby a recording layer with a thickness of 1800 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 73 according to the present invention was fabricated.

EXAMPLES 74 to 112

[Fabrication of Optical Information Recording Media]

The procedure for fabrication of the optical information recording medium No. 73 in Example 73 was repeated except that compound No. 91 employed in Example 73 was replaced by compounds No. 99, No. 103, No. 105, No. 111, No. 115, No. 88 and No. 95 in TABLE 1-(1), compounds No. 183, No. 184, No. 185, No. 191, No. 207, No. 208, No. 200, and No. 196 in TABLE 1-(2), compounds No. 28, No. 29, No. 30, No. 36, No. 52, No. 53, No. 45, No. 41, No. 59, No. 60, No. 62, No. 66, No. 73, No. 74, No. 79 and No. 84 in TABLE 1-(1), compounds No. 215, No. 220, No. 221, No. 222, No. 223, No. 227, No. 228 and No. 233 in TABLE 1-(3), respectively in Examples 73 to 112.

Thus, optical information recording media Nos. 73 to 112 according to the present invention were fabricated.

Comparative Example 4-1

[Fabrication of Optical Information Recording Medium]

The procedure for fabrication of the optical information recording medium No. 73 in Example 73 was repeated except that compound No. 91 employed in Example 73 was replaced by the compound of formula (a) employed in Comparative Example 1, whereby a comparative optical information recording medium No. 4-1 was fabricated.

Comparative Example 4-2

[Fabrication of Optical Information Recording Medium]

The procedure for fabrication of the optical information recording medium No. 97 in Example 97 was repeated except that compound No. 59 employed in Example 97 was replaced by the compound of formula (a) employed in Comparative Example 1, whereby a comparative optical information recording medium No. 4-2 was fabricated.

EXAMPLE 113

[Fabrication of Optical Information Recording Medium]

A guide groove with a depth of 1000 Å, a half width of 0.35 μm and a track pitch of 1.0 μm was formed on an injection-molded polycarbonate disk with a thickness of 0.6 mm, whereby a substrate was prepared.

Compound No. 151 as shown in TABLE 1-(1) was dissolved in a mixed solvent of methylcyclohexane, 2-methoxy-ethanol, methyl ethyl ketone and tetrahydrofuran, and the thus obtained solution of compound No. 151 was applied to the above prepared substrate by spinner coating, whereby a recording layer with a thickness of 1800 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Furthermore, a polycarbonate substrate with a thickness of 0.6 mm was applied to the protective layer, using a hot-melt adhesive agent.

Thus, an optical information recording medium No. 113 according to the present invention was fabricated.

EXAMPLES 114 to 120

[Fabrication of Optical Information Recording Media]

The procedure for fabrication of the optical information recording medium No. 113 in Example 113 was repeated except that compound No. 151 employed in Example 113 was replaced by compounds No. 153, No. 157, No. 158, No. 162, No. 165, No. 166 and No. 168 in TABLE 1-(1), respectively in Examples 114 to 120.

Thus, optical information recording media Nos. 114 to 120 according to the present invention were fabricated.

EXAMPLE 121

[Fabrication of Optical Information Recording Medium]

A guide groove with a depth of 1000 Å, a half width of 0.45 μm and a track pitch of 1.1 μm was formed on an injection-molded polycarbonate disk with a thickness of 0.6 mm, whereby a substrate was prepared.

Compound No. 120 shown in TABLE 1-(1) was dissolved in a mixed solvent of methylcyclohexane, 2-methoxyethanol, methyl ethyl ketone and tetrahydrofuran, and the thus obtained solution of compound No. 120 was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 121 according to the present invention was fabricated.

EXAMPLES 122 to 128

[Fabrication of Optical Information Recording Media]

The procedure for fabrication of the optical information recording medium No. 121 in Example 121 was repeated except that compound No. 120 employed in Example 121 was replaced by compounds No. 122, No. 125, No. 128, No. 133, No. 136, No. 141 and No. 147 in TABLE 1-(1), respectively in Examples 122 to 128.

Thus, optical information recording media Nos. 122 to 128 according to the present invention were fabricated.

To evaluate the recording characteristics of each of the above prepared optical information recording media Nos. 73 to 128 according to the present invention and comparative optical information recording media No. 4-1 and No. 4-2, EFM signals were recorded by applying a semiconductor laser beam with a wavelength of 635 nm and a beam diameter of 1.4 μm to each recording medium, while tracking was conducted, under the condition that the recording linear speed was set at 1.4 m/sec. Thus, the reproduction waveform (initial) obtained from each recording medium was inspected.

Further, the reflectance (initial value) of a non-recorded portion on the guide groove was also measured by using the same laser beams.

The results are shown in TABLE 5.

Each recording medium was caused to deteriorate by exposing it to the light of a xenon lamp of 40,000 lux for 50 hours. After the exposure, the reproduction waveform obtained from each recording medium was inspected in the same manner as mentioned above.

Furthermore, the reflectance of each recording medium was measured in the same manner as mentioned above.

The results are also shown in TABLE 8.

TABLE 5

| Example No. | Comp. No. | Initial Values Reflectance (%) | Initial Values Reproduction Waveform | After Exposure to Xe lamp for 50 hrs. Reflectance (%) | After Exposure to Xe lamp for 50 hrs. Reproduction Waveform |
|---|---|---|---|---|---|
| 73 | 91 | 71 | ○ | 70 | ○ |
| 74 | 99 | 71 | ○ | 70 | ○ |
| 75 | 103 | 72 | ○ | 71 | ○ |
| 76 | 105 | 72 | ○ | 71 | ○ |
| 77 | 111 | 72 | ○ | 70 | ○ |
| 78 | 115 | 73 | ○ | 71 | ○ |
| 79 | 88 | 70 | ○ | 70 | ○ |
| 80 | 95 | 70 | ○ | 69 | ○ |
| 81 | 183 | 71 | ○ | 70 | ○ |
| 82 | 184 | 71 | ○ | 70 | ○ |
| 83 | 185 | 72 | ○ | 70 | ○ |
| 84 | 191 | 73 | ○ | 71 | ○ |
| 85 | 207 | 70 | ○ | 70 | ○ |
| 86 | 208 | 73 | ○ | 71 | ○ |
| 87 | 200 | 67 | ○ | 67 | ○ |
| 86 | 196 | 70 | ○ | 69 | ○ |
| 89 | 28 | 71 | ○ | 70 | ○ |
| 90 | 29 | 71 | ○ | 70 | ○ |
| 91 | 30 | 72 | ○ | 70 | ○ |
| 92 | 36 | 73 | ○ | 71 | ○ |
| 93 | 52 | 70 | ○ | 70 | ○ |
| 94 | 53 | 76 | ○ | 71 | ○ |
| 95 | 45 | 67 | ○ | 67 | ○ |
| 96 | 41 | 70 | ○ | 69 | ○ |
| 97 | 59 | 72 | ○ | 71 | ○ |
| 98 | 60 | 72 | ○ | 71 | ○ |
| 99 | 62 | 72 | ○ | 71 | ○ |
| 100 | 66 | 71 | ○ | 71 | ○ |
| 101 | 73 | 72 | ○ | 70 | ○ |
| 102 | 74 | 72 | ○ | 71 | ○ |
| 103 | 79 | 71 | ○ | 70 | ○ |
| 104 | 84 | 70 | ○ | 70 | ○ |
| 105 | 215 | 71 | ○ | 69 | ○ |
| 106 | 220 | 70 | ○ | 68 | ○ |
| 107 | 221 | 70 | ○ | 69 | ○ |
| 108 | 222 | 71 | ○ | 70 | ○ |
| 109 | 223 | 72 | ○ | 71 | ○ |
| 110 | 227 | 73 | ○ | 70 | ○ |
| 111 | 228 | 72 | ○ | 68 | ○ |
| 112 | 233 | 70 | ○ | 68 | ○ |
| 113 | 151 | 72 | ○ | 72 | ○ |
| 114 | 153 | 72 | ○ | 72 | ○ |
| 115 | 157 | 72 | ○ | 72 | ○ |
| 116 | 158 | 72 | ○ | 71 | ○ |
| 117 | 162 | 72 | ○ | 71 | ○ |

TABLE 5-continued

| Example No. | Comp. No. | Initial Values Reflectance (%) | Initial Values Reproduction Waveform | After Exposure to Xe lamp for 50 hrs. Reflectance (%) | After Exposure to Xe lamp for 50 hrs. Reproduction Waveform |
|---|---|---|---|---|---|
| 118 | 165 | 72 | ○ | 71 | ○ |
| 119 | 166 | 71 | ○ | 70 | ○ |
| 120 | 168 | 70 | ○ | 70 | ○ |
| 121 | 120 | 72 | ○ | 71 | ○ |
| 122 | 122 | 72 | ○ | 71 | ○ |
| 123 | 125 | 72 | ○ | 71 | ○ |
| 124 | 128 | 72 | ○ | 71 | ○ |
| 125 | 133 | 72 | ○ | 70 | ○ |
| 126 | 136 | 72 | ○ | 71 | ○ |
| 127 | 141 | 71 | ○ | 70 | ○ |
| 128 | 147 | 70 | ○ | 70 | ○ |
| Comp. Ex. No. 4-1 | a | 5 | — | 5 | — |
| Comp. Ex. No. 4-2 | b | 15 | Δ | 5 | — |

Note
"○" denotes that the reproduction waveform was clear.
"Δ" denotes that the reproduction waveform was deformed.
"—" denotes that the measurement was impossible.

EXAMPLE 129

[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 112 as shown in TABLE 1-(1) and 1 part by weight of the following compound of formula (b) was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate:

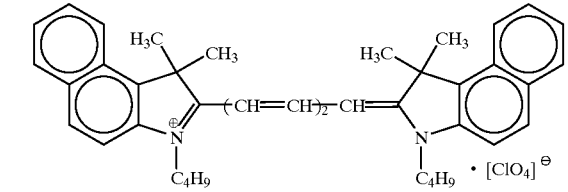

(b)

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 129 according to the present invention was fabricated.

EXAMPLES 130 to 131

[Fabrication of Optical Information Recording Media]

The procedure for fabrication of the optical information recording medium No. 129 in Example 129 was repeated except that compound No. 112 employed in Example 129 was replaced by compound No. 90 and compound No. 91 in TABLE 1-(1), respectively in Examples 130 and 131.

Thus, optical information recording media Nos. 130 and 131 according to the present invention were fabricated.

EXAMPLE 132
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 99 shown in TABLE 1-(1) and 1 part by weight of the following compound of formula (c) was dissolved in a mixed solvent of methylcyclohexane, 2-methoxyethanol, methyl ethyl ketone and tetrahydrofuran, and the thus obtained solution was applied to the above prepared subtrate by spinner coating, whereby a recording layer with a thickness of 1600 Å was provided on the substrate:

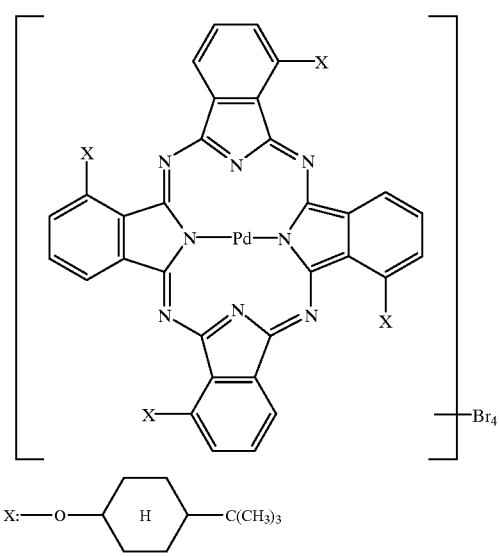

On the thus provided recording layer, a reflection layer of Au with a thickness of 2100 Å was provided by sputtering.

A protective layer made of an acrylic photopolymer with a thickness of 5 mm was then formed on the reflection layer.

Thus, an optical information recording medium No. 132 according to the present invention was fabricated.

EXAMPLE 133
[Fabrication of Optical Information Recording Medium]

The procedure for fabrication of the optical information recording medium No. 132 in Example 132 was repeated except that compound No. 99 employed in Example 132 was replaced by compound No. 100 in TABLE 1-(1), in Example 133.

Thus, an optical information recording medium No. 133 according to the present invention was fabricated.

EXAMPLE 134
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 110 shown in TABLE 1-(1) and 1 part by weight of the following compound of formula (d) was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate:

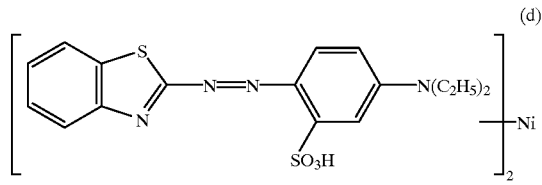

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 134 according to the present invention was fabricated.

EXAMPLE 135
[Fabrication of Optical Information Recording Medium]

The procedure for fabrication of the optical information recording medium No. 134 in Example 134 was repeated except that compound No. 110 employed in Example 134 was replaced by compound No. 115 in TABLE 1-(1), in Example 135.

Thus, an optical information recording medium No. 135 according to the present invention was fabricated.

EXAMPLE 136
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 201 shown in TABLE 1-(2) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 136 according to the present invention was fabricated.

EXAMPLES 137 to 138
[Fabrication of Optical Information Recording Media]

The procedure for fabrication of the optical information recording medium No. 136 in Example 136 was repeated except that compound No. 201 employed in Example 136 was replaced by compound No. 202 and compound No. 203 in TABLE 1-(2), respectively in Examples 137 and 138.

Thus, optical information recording media Nos. 137 and 138 according to the present invention were fabricated.

EXAMPLE 139
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 192 shown in TABLE 1-(1) and 1 part by weight of the compound of formula (c) employed in Example 132 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 139 according to the present invention was fabricated.

EXAMPLE 140
[Fabrication of Optical Information Recording Medium]

The procedure for fabrication of the optical information recording medium No. 139 in Example 139 was repeated except that compound No. 192 employed in Example 139 was replaced by compound No. 194 in TABLE 1-(2), in Example 140.

Thus, an optical information recording medium No. 140 according to the present invention was fabricated.

EXAMPLE 141
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 204 shown in TABLE 1-(2) and 1 part by weight of the compound of formula (d) employed in Example 134 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 141 according to the present invention was fabricated.

EXAMPLE 142
[Fabrication of Optical Information Recording Medium]

The procedure for fabrication of the optical information recording medium No. 141 in Example 141 was repeated except that compound No. 204 employed in Example 141 was replaced by compound No. 210 in TABLE 1-(2), in Example 142.

Thus, an optical information recording medium No. 142 according to the present invention was fabricated.

EXAMPLE 143
[Fabrication of Optical Information Recording Medium]

A guide groove with a depth of 1000 Å, a half width of 0.45 μm and a track pitch of 1.6 μm was formed on an injection-molded polycarbonate disk with a thickness of 1.2 mm, whereby a substrate was prepared.

A mixture of 1 part by weight of Compound No. 17 shown in TABLE 1-(1) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 143 according to the present invention was fabricated.

EXAMPLES 144 to 145
[Fabrication of Optical Information Recording Media]

The procedure for fabrication of the optical information recording medium No. 143 in Example 143 was repeated except that compound No. 17 employed in Example 143 was replaced by compound No. 18 and compound No. 19 in TABLE 1-(1), respectively, in Examples 144 and 145.

Thus, optical information recording media No. 144 and No. 145 according to the present invention were fabricated.

EXAMPLE 146
[Fabrication of Optical Information Recording Medium]

A guide groove with a depth of 1000 Å, a half width of 0.45 μm and a track pitch of 1.6 μm was formed on an injection-molded polycarbonate disk with a thickness of 1.2 mm, whereby a substrate was prepared.

A mixture of 1 part by weight of Compound No. 21 shown in TABLE 1-(1) and 1 part by weight of the compound of formula (c) employed in Example 132 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 146 according to the present invention was fabricated.

EXAMPLE 147
[Fabrication of Optical Information Recording Media]

The procedure for fabrication of the optical information recording medium No. 146 in Example 146 was repeated except that compound No. 21 employed in Example 146 was replaced by compound No. 23 in TABLE 1-(1), in Example 147.

Thus, an optical information recording medium No. 147 according to the present invention was fabricated.

EXAMPLE 148
[Fabrication of Optical Information Recording Medium]

A guide groove with a depth of 1000 Å, a half width of 0.45 μm and a track pitch of 1.6 μm was formed on an injection-molded polycarbonate disk with a thickness of 1.2 mm, whereby a substrate was prepared.

A mixture of 1 part by weight of compound No. 24 shown in TABLE 1-(1) and 1 part by weight of the compound of formula (d) employed in Example 134 was dissolved in a mixed solvent of methylcyclohexane, 2-methoxyethanol, methyl ethyl ketone and tetrahydrofuran and the thus obtained solution wag applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical Information recording medium No. 148 according to the present invention was fabricated.

EXAMPLE 149

[Fabrication of Optical Information Recording Medium]

The procedure for fabrication of the optical information recording medium No. 148 in Example 148 was repeated except that compound No. 24 employed in Example 148 was replaced by compound No. 25 in TABLE 1-(1) in Example 149.

Thus, an optical information recording medium No. 149 according to the present invention was fabricated.

Comparative Example 5-1

[Fabrication of Optical Information Recording Medium]

The procedure for fabrication of the optical information recording medium No. 129 in Example 129 was repeated except that compound No. 112 employed in Example 129 was not used, but only the compound of formula (b) employed in Example 129 was employed, whereby a comparative optical information recording medium No. 5-1 was fabricated.

Comparative Example 5-2

[Fabrication of Optical Information Recording Medium]

The procedure for fabrication of the optical information recording medium No. 129 in Example 129 was repeated except that compound No. 112 employed in Example 129 was not used, but only the compound of formula (c) employed in Example 132 was used, whereby a comparative optical information recording medium No. 5-2 was fabricated.

Comparative Example 5-3

[Fabrication of Optical Information Recording Medium]

The procedure for fabrication of the optical information recording medium No. 129 in Example 129 was repeated except that compound No. 112 employed in Example 129 was not used, but only the compound of formula (d) employed in Example 134 was used, whereby a comparative optical information recording medium No. 5-3 was fabricated.

To evaluate the recording characteristics of each of the above prepared optical information recording media Nos. 129 to 149 according to the present invention and comparative optical information recording media No. 5-1 to No. 5-3, EFM signals were recorded by applying a semiconductor laser beam with a wavelength of 780 nm and a beam diameter of 1.6 $\mu$m to each recording medium, while tracking was conducted, under the condition that the recording linear speed was set at 1.4 m/sec. Thus, the reproduction waveform obtained from each recording medium was inspected. The recorded EFM signals were reproduced, using the same laser beam as mentioned above, and also applying a semiconductor continuous laser beam with a wavelength of 680 nm and a beam diameter of 1.1 $\mu$m to each recording medium. Thus, the two reproduction waveforms obtained from each recording medium were inspected.

The results are shown in TABLE 6.

TABLE 6

| Example No. | Comp. No. | 780 nm | | 680 nm | |
| --- | --- | --- | --- | --- | --- |
| | | Reflectance (%) | Reproduction Waveform | Reflectance (%) | Reproduction Waveform |
| 129 | 112 | 72 | ○ | 23 | ○ |
| 130 | 90 | 71 | ○ | 22 | ○ |
| 131 | 91 | 71 | ○ | 23 | ○ |
| 132 | 99 | 70 | ○ | 22 | ○ |
| 133 | 100 | 71 | ○ | 21 | ○ |
| 134 | 110 | 70 | ○ | 20 | ○ |
| 135 | 115 | 70 | ○ | 20 | ○ |
| 136 | 201 | 72 | ○ | 23 | ○ |
| 137 | 202 | 71 | ○ | 22 | ○ |
| 138 | 203 | 71 | ○ | 23 | ○ |
| 139 | 192 | 70 | ○ | 22 | ○ |
| 140 | 194 | 71 | ○ | 21 | ○ |
| 141 | 204 | 70 | ○ | 20 | ○ |
| 142 | 210 | 70 | ○ | 20 | ○ |
| 143 | 17 | 72 | ○ | 21 | ○ |
| 144 | 18 | 70 | ○ | 23 | ○ |
| 145 | 19 | 71 | ○ | 23 | ○ |
| 146 | 21 | 71 | ○ | 22 | ○ |
| 147 | 23 | 71 | ○ | 21 | ○ |
| 148 | 24 | 72 | ○ | 20 | ○ |
| 149 | 25 | 70 | ○ | 21 | ○ |
| Comp. Ex. No. 5-1 | b | 75 | ○ | 5 | X |
| Comp. Ex. No. 5-2 | c | 74 | ○ | 5 | X |
| Comp. Ex. No. 5-3 | d | 74 | ○ | 5 | X |

Note:
"○" denotes that the reproduction waveform was clear.
"—" denotes that the measurement was impossible.

EXAMPLE 150

[Fabrication of Optical Information Recording Medium]

A guide groove with a depth of 1000 Å, a half width of 0.40 $\mu$m and a track pitch of 1.1 $\mu$m was formed on an injection-molded polycarbonate disk with a thickness of 1.2 mm, whereby a substrate was prepared.

A mixture of 1 part by weight of Compound No. 64 shown in TABLE 1-(1) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 $\mu$m was then formed on the reflection layer.

Thus, an optical information recording medium No. 150 according to the present invention was fabricated.

EXAMPLES 151 to 155

[Fabrication of Optical Information Recording Media]

The procedure for fabrication of the optical information recording medium No. 150 in Example 150 was repeated except that compound No. 64 employed in Example 150 was replaced by compounds No. 61, No. 68, No. 158, No. 162 and No. 168 in TABLE 1-(1), respectively, in Examples 151 to 155.

Thus, optical information recording media Nos. 151 to 155 according to the present invention were fabricated.

EXAMPLE 156

[Fabrication of Optical Information Recording Medium]

A guide groove with a depth of 1000 Å, a half width of 0.40 $\mu$m and a track pitch of 1.1 $\mu$m was formed on an injection-molded polycarbonate disk with a thickness of 1.2 mm, whereby a substrate was prepared.

A mixture of 1 part by weight of Compound No. 11 shown in TABLE 1-(1) and 1 part by weight of the compound of formula (c) employed in Example 132 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 156 according to the present invention was fabricated.

EXAMPLES 157 to 159
[Fabrication of Optical Information Recording Media]

The procedure for fabrication of the optical information recording medium No. 156 in Example 156 was repeated except that compound No. 11 employed in Example 156 was replaced by compounds No. 17, No. 165, and No. 173 in TABLE 1-(1), respectively, in Examples 157 to 159.

Thus, optical information recording media Nos. 157 to 159 according to the present invention were fabricated.

EXAMPLE 160
[Fabrication of Optical Information Recording Medium]

A guide groove with a depth of 1000 μ, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 22 shown in TABLE 1-(1) and 1 part by weight of the compound of formula (d) employed in Example 134 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 160 according to the present invention was fabricated.

EXAMPLES 161 to 163
[Fabrication of Optical Information Recording Media]

The procedure for fabrication of the optical information recording medium No. 160 in Example 160 was repeated except that compound No. 22 employed in Example 160 was replaced by compounds No. 28, NO. 151, and No. 154 in TABLE 1-(1), respectively, in Examples 161 to 163.

Thus, optical information recording media Nos. 161 to 163 according to the present invention were fabricated.

EXAMPLE 164
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 46 shown in TABLE 1-(1) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 164 according to the present invention was fabricated.

EXAMPLES 165 to 169
[Fabrication of Optical Information Recording Media]

The procedure for fabrication of the optical information recording medium No. 164 in Example 164 was repeated except that compound No. 46 employed in Example 164 was replaced by compounds No. 47, No. 48 in TABLE 1-(1), No. 229, No. 232 and No. 238 in TABLE 1-3, respectively, in Examples 165 to 169.

Thus, optical information recording media Nos. 165 to 169 according to the present invention were fabricated.

EXAMPLE 170
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 37 shown in TABLE 1-(1) and 1 part by weight of the compound of formula (c) employed in Example 132 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 170 according to the present invention was fabricated.

EXAMPLES 171 to 173
[Fabrication of Optical Information Recording Media]

The procedure for fabrication of the optical information recording medium No. 170 in Example 170 was repeated except that compound No. 37 employed in Example 170 was replaced by compound No. 39 in TABLE 1-(1), compound No. 230 and compound No. 234 in TABLE 1-(3), respectively, in Examples 171 to 173.

Thus, optical information recording media Nos. 171 to 173 according to the present invention were fabricated.

EXAMPLE 174
[Fabrication of Optical Information Recording Medium]

A guide groove with a depth of 1000 Å, a half width of 0.40 μm and a track pitch of 1.1 μm was formed on an injection-molded polycarbonate disk with a thickness of 1.2 mm, whereby a substrate was prepared.

A mixture of 1 part by weight of Compound No. 49 shown in TABLE 1-(1) and 1 part by weight of the compound of formula (d) employed in Example 134 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 174 according to the present invention was fabricated.

EXAMPLES 175 to 177
[Fabrication of Optical Information Recording Media]

The procedure for fabrication of the optical information recording medium No. 174 in Example 174 was repeated except that compound No. 49 employed in Example 174 was replaced by compound No. 55 in TABLE 1-(1), compound No. 231 and compound No. 235 in TABLE 1-(3), respectively, in Examples 175 to 177.

Thus, optical information recording media Nos. 175 to 177 according to the present invention were fabricated.

EXAMPLE 178
[Fabrication of Optical Information Recording Medium]

A guide groove with a depth of 1000 Å, a half width of 0.40 μm and a track pitch of 1.1 μm was formed on an injection-molded polycarbonate disk with a thickness of 0.6 mm, whereby a substrate was prepared.

A mixture of 1 part by weight of Compound No. 123 shown in TABLE 1-(1) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 178 according to the present invention was fabricated.

EXAMPLES 179 to 180
[Fabrication of Optical Information Recording Media]

The procedure for fabrication of the optical information recording medium No. 178 in Example 178 was repeated except that compound No. 123 employed in Example 178 was replaced by compound No. 124 and compound No. 130 in TABLE 1-(1), respectively, in Examples 179 to 180.

Thus, optical information recording media Nos. 179 to 180 according to the present invention were fabricated.

EXAMPLE 181
[Fabrication of Optical Information Recording Medium]

A guide groove with a depth of 1000 Å, a half width of 0.40 μm and a track pitch of 1.1 μm was formed on an injection-molded polycarbonate disk with a thickness of 0.6 mm, whereby a substrate was prepared.

A mixture of 1 part by weight of Compound No. 131 shown in TABLE 1-(1) and 1 part by weight of the compound of formula (c) employed in Example 132 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 181 according to the present invention was fabricated.

EXAMPLE 182
[Fabrication of Optical Information Recording Medium]

The procedure for fabrication of the optical information recording medium No. 181 in Example 181 was repeated except that compound No. 131 employed in Example 181 was replaced by compound No. 135 in TABLE 1-(1), in Example 182.

Thus, optical information recording medium No. 182 according to the present Invention was fabricated.

EXAMPLE 183
[Fabrication of Optical Information Recording Medium]

A guide groove with a depth of 1000 Å, a half width of 0.40 μm and a track pitch of 1.1 μm was formed on an injection-molded polycarbonate disk with a thickness of 0.6 mm, whereby a substrate was prepared.

A mixture of 1 part by weight of Compound No. 140 shown in TABLE 1-(1) and 1 part by weight of the compound of formula (d) employed in Example 134 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1600 Å was provided on the substrate.

On the thus provided recording layer, a reflection layer of Au with a thickness of 2100 Å was provided by sputtering.

A protective layer made of an acrylic photopolymer with a thickness of 5 μm was then formed on the reflection layer.

Thus, an optical information recording medium No. 183 according to the present invention was fabricated.

EXAMPLE 184
[Fabrication of Optical Information Recording Medium]

The procedure for fabrication of the optical information recording medium No. 183 in Example 183 was repeated except that compound No. 140 employed in Example 183 was replaced by compound No. 142 in TABLE 1-(1), in Example 184.

Thus, optical information recording medium No. 184 according to the present invention was fabricated.

Comparative Example 6-1
[Fabrication of Optical Information Recording Medium]

The procedure for fabrication of the optical information recording medium No. 150 in Example 150 was repeated except that compound No. 64 employed in Example 150 was not used, but only the compound of formula (b) employed in Example 129 was employed, whereby a comparative optical information recording medium No. 6-1 was fabricated.

Comparative Example 6-2
[Fabrication of Optical Information Recording Medium]

The procedure for fabrication of the optical information recording medium No. 150 in Example 150 was repeated except that compound No. 64 employed in Example 150 was not used, but only the compound of formula (c) employed in Example 132 was used, whereby a comparative optical information recording medium No. 6-2 was fabricated.

Comparative Example 6-3
[Fabrication of Optical Information Recording Medium]

The procedure for fabrication of the optical information recording medium No. 150 in Example 150 was repeated except that compound No. 64 employed in Example 150 was not used, but only the compound of formula (d) employed in Example 134 was used, whereby a comparative optical information recording medium No. 6-3 was fabricated.

To evaluate the recording characteristics of each of the above prepared optical information recording media Nos. 150 to 184 according to the present invention and comparative optical information recording media No. 6-1 to No. 6-3, EFM signals were recorded by applying a semiconductor laser beam with a wavelength of 780 nm and a beam diameter of 1.6 μm to each recording medium, while tracking was conducted, under the condition that the recording linear speed was set at 1.4 m/sec. Thus, the reproduction waveform obtained from each recording medium was inspected. The recorded EFM signals were reproduced using the same laser beam as above-mentioned, and also applying a semiconductor continuous laser beam with a wavelength of 635 nm and a beam diameter of 1.1 μm to each recording medium. Thus, the two reproduction waveforms obtained from each recording medium were inspected.

The results are shown in TABLE 7.

TABLE 7

| Example No. | Comp. No. | 780 nm Reflectance (%) | 780 nm Reproduction Waveform | 635 nm Reflectance (%) | 635 nm Reproduction Waveform |
|---|---|---|---|---|---|
| 150 | 64 | 72 | ◯ | 22 | ◯ |
| 151 | 61 | 72 | ◯ | 22 | ◯ |
| 152 | 68 | 71 | ◯ | 22 | ◯ |
| 153 | 158 | 73 | ◯ | 23 | ◯ |
| 154 | 162 | 73 | ◯ | 23 | ◯ |
| 155 | 168 | 72 | ◯ | 23 | ◯ |
| 156 | 11 | 72 | ◯ | 22 | ◯ |
| 157 | 17 | 71 | ◯ | 22 | ◯ |
| 158 | 165 | 72 | ◯ | 22 | ◯ |
| 159 | 173 | 71 | ◯ | 21 | ◯ |
| 160 | 22 | 70 | ◯ | 20 | ◯ |
| 161 | 28 | 70 | ◯ | 20 | ◯ |
| 162 | 151 | 72 | ◯ | 21 | ◯ |
| 163 | 154 | 72 | ◯ | 22 | ◯ |
| 164 | 46 | 72 | ◯ | 23 | ◯ |
| 165 | 47 | 71 | ◯ | 22 | ◯ |
| 166 | 48 | 71 | ◯ | 23 | ◯ |
| 167 | 229 | 70 | ◯ | 25 | ◯ |
| 168 | 232 | 72 | ◯ | 23 | ◯ |
| 169 | 238 | 72 | ◯ | 22 | ◯ |
| 170 | 37 | 70 | ◯ | 22 | ◯ |
| 171 | 39 | 71 | ◯ | 21 | ◯ |
| 172 | 230 | 70 | ◯ | 24 | ◯ |
| 173 | 234 | 71 | ◯ | 22 | ◯ |
| 174 | 49 | 70 | ◯ | 20 | ◯ |
| 175 | 55 | 70 | ◯ | 20 | ◯ |
| 176 | 231 | 72 | ◯ | 23 | ◯ |
| 177 | 235 | 71 | ◯ | 22 | ◯ |
| 178 | 123 | 72 | ◯ | 22 | ◯ |
| 179 | 124 | 72 | ◯ | 22 | ◯ |
| 180 | 130 | 71 | ◯ | 22 | ◯ |
| 181 | 131 | 72 | ◯ | 22 | ◯ |
| 182 | 135 | 71 | ◯ | 22 | ◯ |
| 183 | 140 | 71 | ◯ | 21 | ◯ |
| 184 | 142 | 71 | ◯ | 21 | ◯ |
| Comp. Ex. No. 6-1 | b | 75 | ◯ | 5 | X |
| Comp. Ex. No. 6-2 | c | 74 | ◯ | 5 | X |
| Comp. Ex. No. 6-3 | d | 74 | ◯ | 5 | X |

Note:
"◯" denotes that the reproduction waveform was clear.
"X" denotes that the reproduction was impossible.

EXAMPLE 185

[Fabrication of Optical Information Recording Medium]

A guide groove with a depth of 1200 Å, a half width of 0.4 μm and a track pitch of 1.4 μm was formed on a photopolymer provided on a polymethyl methacrylate disk with a thickness of 1.2 μm, whereby a substrate was prepared.

Compound No. 249 shown in TABLE 1-(4) was dissolved in 1,2-dichloroethane, and the thus obtained solution of compound No. 249 was applied to the above prepared substrate by spinner coating, whereby a recording layer with a thickness of 800 Å was provided on the substrate.

Thus, an optical information recording medium No. 185 according to the present invention was fabricated.

EXAMPLES 186 to 199

[Fabrication of Optical Information Recording Media]

The procedure for fabrication of the optical information recording medium No. 185 in Example 185 was repeated except that compound No. 249 employed in Example 185 was replaced by compounds No. 250, No. 251, No. 252, and No. 246 shown in TABLE 1-(4), respectively, in Examples 186 to 189.

Thus, optical Information Recording Media Nos. 186 to 189 according to the present invention were fabricated.

To evaluate the recording characteristics of each of the above prepared optical information recording media Nos. 185 to 188 according to the present invention, information was recorded by applying a laser beam with a wavelength of 680 nm to the substrate aide of each recording medium, under the conditions that the recording frequency was 1.25 MHZ, and the recording linear speed was 1.2 m/sec.

Using the same laser as employed in the above, a continuous wave laser beam having a reproduction power of 0.25 to 0.3 mW was applied to each recording medium to reproduce the recorded information, and the light reflected from the recording medium was detected. The detected light was subjected to a spectral analysis, using a scanning filter at a band width of 30 kHz, so that the initial C/N (carrier/noise) ratio was obtained.

Further, the reflectance (initial value) of a non-recorded portion on the guide groove was also measured by using the same laser beams.

The results are shown in TABLE 8.

Each recording medium was caused to deteriorate by exposing it to the light of a xenon lamp of 40,000 lux for 50 hours. After the exposure, the reflectance and the C/N ratio of each recording medium were measured in the same manner an in the above. The results are also shown in TABLE 8.

Each recording medium was caused to deteriorate by allowing it to stand at 85° C., 85% RH for 720 hours, and then the reflectance and the C/N ratio of each recording medium were measured in the same manner as in the above. The results are also shown in TABLE 8.

The optical information recording medium No. 189 was also evaluated with respect to the recording characteristics thereof in the same manner as mentioned above except that the wavelength of the laser beam employed was changed from 680 nm to 635 nm. The results are also shown in TABLE 8.

TABLE 8

| | | Initial Values | | After Exposure to Xe lamp for 50 hrs. | | After storage at 85° C., 85% RH for 720 hrs. | |
|---|---|---|---|---|---|---|---|
| Example No. | Compound No. | Reflectance (%) | C/N (dB) | Reflectance (%) | C/N (dB) | Reflectance (%) | C/N (dB) |
| 185 | 249 | 26 | 51 | 24 | 50 | 24 | 50 |
| 186 | 250 | 27 | 51 | 26 | 50 | 24 | 49 |
| 187 | 251 | 25 | 50 | 25 | 50 | 25 | 49 |
| 188 | 252 | 25 | 52 | 25 | 52 | 25 | 51 |
| 189 | 246 | 25 | 50 | 25 | 49 | 25 | 49 |

EXAMPLE 190

[Fabrication of Optical Information Recording Medium]

A guide groove with a depth of 1000 Å, a half width of 0.40 µm and a track pitch of 1.6 µm was formed on an injection-molded polycarbonate disk with a thickness of 1.2 mm, whereby a substrate was prepared.

Compound No. 253 shown in TABLE 1-(4) was dissolved in a mixed solvent of methylcyclohexane, 2-methoxyethanol, methyl ethyl ketone and tetrahydrofuran, and the thus obtained solution of compound No. 253 was applied to the above prepared substrate by spinner coating, whereby a recording layer with a thickness of 1800 Å was provided on the substrate.

On the thus provided recording layer, a reflection layer of Au with a thickness of 2000 Å was provided by sputtering.

A protective layer made of an acrylic photopolymer with a thickness of 5 µm was then formed on the reflection layer.

Thus, an optical information recording medium No. 190 according to the present invention was fabricated.

EXAMPLES 191 to 194

[Fabrication of Optical Information Recording Media]

The procedure for fabrication of the optical information recording medium No. 190 in Example 190 was repeated except that compound No. 253 employed in Example 190 was replaced by compounds No. 254, No. 260, No. 244 and No. 245 shown in TABLE 1-(4), respectively, in Examples 191 to 194.

Thus, optical information recording media Nos. 191 to 194 according to the present invention were fabricated.

To evaluate the recording characteristics of each of the above prepared optical information recording media Nos. 190 to 192 according to the present invention, EFM signals were recorded by applying a semiconductor laser beam with a wavelength of 680 nm and a beam diameter of 1.4 µm to each recording medium, while tracking was conducted, under the condition that the recording linear speed was set at 1.4 m/sec. Thus, the reproduction waveform (initial) obtained from each recording medium was inspected.

Further, the reflectance (initial value) of a non-recorded portion on the guide groove was also measured by using the same laser beams.

The results are shown in TABLE 9.

The optical information recording media No. 193 to No. 194 was also evaluated with respect to the recording characteristics thereof in the same manner as mentioned above except that the wavelength of the laser beam employed was changed from 680 nm to 635 nm. The results are also shown in TABLE 9.

Each recording medium of the recording media Nos. 190 to 194 was caused to deteriorate by exposing it to the light of a xenon lamp of 40,000 lux for 50 hours. After the exposure, the reproduction waveform obtained from each recording medium was inspected in the same manner as mentioned above. Furthermore, the reflectance of each recording medium was measured in the same manner as mentioned above. The results are also shown in TABLE 9.

TABLE 9

| Example No. | Comp. No. | Initial Values | | After Exposure to Xe lamp for 50 hrs. | |
|---|---|---|---|---|---|
| | | Reflectance (%) | Reproduction Waveform | Reflectance (%) | Reproduction Waveform |
| 190 | 253 | 72 | ○ | 70 | ○ |
| 191 | 254 | 73 | ○ | 71 | ○ |
| 192 | 260 | 73 | ○ | 71 | ○ |
| 193 | 244 | 67 | ○ | 67 | ○ |
| 194 | 245 | 70 | ○ | 69 | ○ |

Note:
"○" denotes that the reproduction waveform was clear.

EXAMPLE 195

[Fabrication of Optical Information Recording Medium]

A guide groove with a depth of 1000 Å, a half width of 0.45 µm and a track pitch of 1.6 µm was formed on an injection-molded polycarbonate disk with a thickness of 1.2 mm, whereby a substrate was prepared.

A mixture of 1 part by weight of compound No. 259 shown in TABLE 1-(4) and 1 part by weight of the compound of formula (b) employed in Example 129 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 km was then formed on the reflection layer.

Thus, an optical information recording medium No. 195 according to the present invention was fabricated.

EXAMPLES 196 to 197

[Fabrication of Optical Information Recording Media]

The procedure for fabrication of the optical information recording medium No. 195 in Example 195 was repeated except that compound No. 259 employed in Example 195 was replaced by compounds No. 260 and No. 261 shown in TABLE 1-(4), respectively, in Examples 196 to 197.

Thus, optical information recording media Nos. 196 to 197 according to the present invention were fabricated.

To evaluate the recording characteristics of each of the above prepared optical information recording media Nos. 195 to 197 according to the present invention, EFM signals were recorded by applying a semiconductor laser beam with a wavelength of 780 nm and a beam diameter of 1.6 µm to each recording medium, while tracking was conducted, under the condition that the recording linear speed was set at 1.4 m/sec. Thus, the reproduction waveform obtained from each recording medium was inspected.

Further, the reflectance (initial value) of a non-recorded portion on the guide groove was also measured by using the same laser beam with a wavelength of 780 nm as mentioned above.

The results are shown in TABLE 10.

The recorded EFM signals were reproduced using the same laser beam as above-mentioned, and also applying a semiconductor continuous laser beam with a wavelength of 680 nm and a beam diameter of 1.1 µm to each recording medium. Thus, the two reproduction waveforms obtained from each recording medium were inspected.

Further, the reflectance of the non-recorded portion on the guide groove was also measured by using the same laser beam with a wavelength of 680 nm as mentioned above.

The results are shown in TABLE 10.

TABLE 10

| | | 780 nm | | 680 nm | |
|---|---|---|---|---|---|
| Example No. | Comp. No. | Reflectance (%) | Reproduction Waveform | Reflectance (%) | Reproduction Waveform |
| 195 | 259 | 71 | ○ | 22 | ○ |
| 196 | 260 | 71 | ○ | 22 | ○ |
| 197 | 261 | 70 | ○ | 23 | ○ |
| 198 | 246 | 69 | ○ | 20 | ○ |

Note:
"○" denotes that the reproduction waveform was clear.

EXAMPLE 198

[Fabrication of Optical Information Recording Medium]

A guide groove with a depth of 1000 Å, a half width of 0.45 μm and a track pitch of 1.6 μm was formed on an injection-molded polycarbonate disk with a thickness of 1.2 mm, whereby a substrate was prepared.

A mixture of 1 part by weight of compound No. 246 shown in TABLE 1-(4) and 1 part by weight of the compound of formula (d) employed in Example 134 was dissolved in a mixed solvent of methylcyclohexane, 2-methoxyethanol, methyl ethyl ketone and tetrahydrofuran, and the thus obtained solution was applied to the above prepared substrate by spinner coating, whereby a recording layer with a thickness of 1700 Å was provided on the substrate.

On the thus provided recording layer, a reflection layer of Au with a thickness of 2000 Å was provided by sputtering.

A protective layer made of an acrylic photopolymer with a thickness of 5 μm was then formed on the reflection layer.

Thus, an optical information recording medium No. 198 according to the present invention was fabricated.

To evaluate the recording characteristics of each of the above prepared optical information recording medium No. 198 according to the present invention, EFM signals were recorded by applying a semiconductor laser beam with a wavelength of 780 nm and a beam diameter of 1.6 μm to the recording medium, while tracking was conducted, under the condition that the recording linear speed was set at 1.4 m/sec. Thus, the reproduction waveform obtained from the recording medium was inspected.

Further, the reflectance (initial value) of a non-recorded portion on the guide groove was also measured by using the same laser beam with a wavelength of 780 nm as mentioned above.

The results are shown in TABLE 11.

The recorded EFM signals were reproduced using the same laser beam as above-mentioned, and also applying a semiconductor continuous laser beam with a wavelength of 635 nm and a beam diameter of 1.1 μm to each recording medium. Thus, the two reproduction waveforms obtained from the recording medium were inspected.

Further, the reflectance of the non-recorded portion on the guide groove was also measured by using the same laser beam with a wavelength of 635 nm as mentioned above.

The results are shown in TABLE 11.

TABLE 11

| | | 780 nm | | 680 nm | |
|---|---|---|---|---|---|
| Example No. | Comp. No. | Reflectance (%) | Reproduction Waveform | Reflectance (%) | Reproduction Waveform |
| 198 | 246 | 69 | ○ | 20 | ○ |

Note:
"○" denotes that the reproduction waveform was clear.

Thus, according to the present invention, there can be provided optical information recording media which have excellent light resistance and preservability and can be used in a high density optical disk system which uses a semiconductor laser beam with a shorter wavelength than that of a laser beam employed in the conventional optical information recording disk systems.

Furthermore, according to the present invention, there in provided a CD-R recording medium which may be employed for a high density disk system for the next generation.

Japanese Patent Application No. 8-034291 filed Jan. 29, 1996 and Japanese Patent Application No. 8-177545 filed Jun. 18, 1996 are hereby incorporated by reference.

What is claimed is:

1. An optical information recording medium comprising:
a substrate, and
a recording layer formed on said substrate, said recording layer comprising at least one compound represented by formula (I):

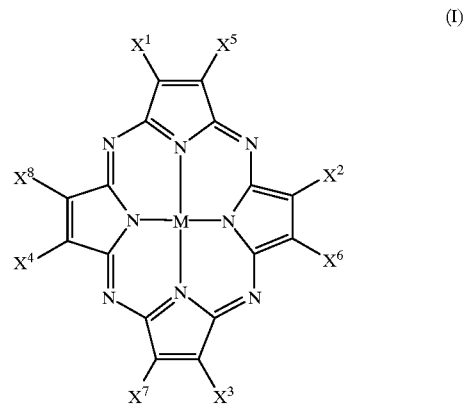

wherein:
M represents a bivalent, trivalent or tetravalent metal selected from the group consisting of Ca, Mg, Cu, Ni, Pd, Pb, Pt, Cd, Ru, In, Ga, Ti, Mn, Ti, Sn, Cr and Ga to which there may be bonded at least one oxygen atom or at least one halogen atom, or said bivalent, trivalent or tetravalent metal to which there may be bonded an unsubstituted or substituted alkyl group, an unsubstituted or substituted aryl group, an unsubstituted or substituted alkoxyl group, an unsubstituted or substituted aryloxy group, $-(OPR^1R^2)_p$, $-(OPOR^3R^4)_p$, $-(OSiR^5R^6R^7)_p$, $-(OCOR^8)_p$, $-(OR^9)_p$, $-(OCOCOOR^{10})_p$, $-(OCOCOR^{11})_p$ or $-(OCONR^{12}R^{13})_p$ in which $R^1$ to $R^{13}$ are each independently a hydrogen atom, an unsubstituted or substituted monovalent aliphatic hydrocarbon group, or an unsubstituted or substituted monovalent aromatic hydrocarbon group, and p is an integer of 0 to 2, and $X^1$ to $X^8$ are each independently a hydrogen atom, a halogen atom, a cyano group, an unsubstituted or substituted straight-chain or branched alkyl group, an unsubstituted or substituted alkoxyl group, a carboxyl acid ester group, an unsubstituted or substituted aryl group, an unsubstituted or substituted aryloxy group, an unsubstituted or substituted alkylthio group, an unsubstituted or substituted arylthio group, an unsubstituted or substituted benzyl group, an unsubstituted or substituted benzyloxy group, an unsubstituted or substituted benzylthio group or a heterocyclic group;

provided that at least one of $X^1$ to $X^8$ is an unsubstituted or substituted alkoxyl group, a halogen atom or a cyano group.

2. The optical information recording medium as claimed in claim 1, wherein in the formula (I), $X^1$ to $X^4$ are each independently a hydrogen atom or an unsubstituted or substituted straight-chain or branched alkyl group, and $X^5$ to $X^8$ are each independently a hydrogen atom, an unsubstituted or substituted alkoxyl group or a halogen atom, provided that $X^1$ to $X^8$ cannot be a hydrogen atom at the same time.

3. The optical information recording medium as claimed in claim 1, wherein in the formula (I), $X^1$ to $X^4$ are each independently a hydrogen atom or an unsubstituted or substituted straight-chain or branched alkyl group, and $X^5$ to $X^8$ are each independently a hydrogen atom or a halogen atom, provided that $X^1$ to $X^8$ cannot be a hydrogen atom at the same time.

4. The optical information recording medium as claimed in claim 1, wherein in the formula (I), $X^1$ to $X^4$ are each independently a hydrogen atom, an unsubstituted or substituted straight-chain or branched alkyl group, or an unsubstituted or substituted alkoxyl group, and $X^5$ to $X^8$ are each independently an unsubstituted phenyl group or a substituted phenyl group with at most two substituents which are selected from the group consisting of a straight chain or branched alkyl group which may be substituted with a halogen atom, an unsubstituted or substituted alkoxyl group, and an aryl group which may be substituted with a halogen atom.

5. The optical information recording medium an claimed in claim 1, wherein in the formula (I), $X^1$ to $X^4$ are each a cyano group, and $X^5$ to $X^8$ are each independently an unsubstituted or substituted, straight chain or branched alkyl group.

6. The optical information recording medium as claimed in claim 1, wherein in the formula (I), $X^1$ to $X^4$ are each a cyano group, and $X^5$ to $X^8$ are each independently an unsubstituted or substituted aryl group.

7. The optical information recording medium as claimed in claim 1, wherein in the formula (I), $X^1$ to $X^4$ are each a cyano group, and $X^5$ to $X^8$ are each independently a substituted phenyl group, with at least one of the substituents thereof being selected from the group consisting of a fluorine atom, a fluorine atom bonded alkyl group and a fluorine atom bonded alkoxyl group.

8. The optical information recording medium an claimed in claim 1, wherein in the formula (I), $X^1$ to $X^4$ are each independently a hydrogen atom or an unsubstituted or substituted straight chain or branched alkyl group, and $X^5$ to $X^8$ are each independently a hydrogen atom, an unsubstituted or substituted straight chain or branched alkyl group, or a halogen atom.

9. The optical information recording medium as claimed in claim 8, wherein in the formula (I), $X^1$ is not the same as $X^5$ ($X^1 \neq X^5$), $X^2$ is not the same as $X^6$ ($X^2 \neq X^6$), $X^3$ is not the same as $X^7$ ($X^3 \neq X^7$), and $X^4$ is not the same as $X^8$ ($X^4 \neq X^8$).

10. The optical information recording medium as claimed in claim 1, wherein said recording layer further comprises at least one organic dye having a maximum absorption wavelength in the range of 680 nm to 750 nm.

11. The optical information recording medium as claimed in claim 10, wherein said organic dye having a maximum absorption wavelength in the range of 680 nm to 750 nm is selected from the group consisting of a cyanine dye, a phthalocyanine dye and an azo metal chelate dye.

12. The optical information recording medium as claimed in claim 1, wherein said recording layer is capable of recording information with the application of a laser beam with a wavelength of 630 nm to 720 nm thereto.

13. The optical recording medium as claimed in claim 1, further comprising an undercoat layer between said substrate and said recording layer.

14. The optical information recording medium as claimed in claim 1, further comprising a reflection layer on said recording layer.

15. The optical information recording medium as claimed in claim 14, further comprising a protective layer on said reflection layer.

16. The optical information recording medium as claimed in claim 14, wherein said reflection layer comprises a material selected from the group consisting of aluminum and gold.

17. The optical information recording medium as claimed in claim 1, further comprising a protective layer on said recording layer.

18. The optical information recording medium as claimed in claim 17, wherein said protective layer comprises an ultraviolet-curing resin.

19. An optical information recording medium comprising:

a substrate, and a recording layer formed on said substrate, said recording layer comprising at least one compound represented by formula (II):

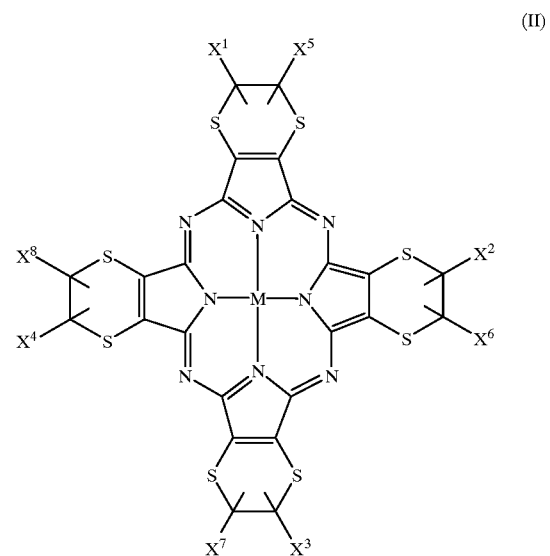

wherein:

M represents two independent hydrogen atoms, a bivalent, trivalent or tetravalent metal to which there may be bonded at least one oxygen atom or at least one halogen atom, or a bivalent, trivalent or tetravalent metal to which there may be bonded an unsubstituted or substituted alkyl group, an unsubstituted or substituted aryl group, an unsubstituted or substituted alkoxyl group, an unsubstituted or substituted aryloxy group, —(OPR$^1$R$^2$)$_p$, —(OPOR$^3$R$^4$)$_p$, —(OSiR$^5$R$^6$R$^7$)$_p$, —(OCOR$^8$)$_p$, —(OR$^9$)$_p$, —(OCOCOOR$^{10}$)$_p$, —(OCOCOR$^{11}$)$_p$ or —(OCONR$^{12}$R$^{13}$)$_p$ in which R$^1$ to R$^{13}$ are each independently a hydrogen atom, an unsubstituted or substituted monovalent aliphatic hydrocarbon group, or an unsubstituted or substituted monovalent aromatic hydrocarbon group, and p is an integer of 0 to 2, and X$^1$ to X$^8$ are each independently a hydrogen atom, a halogen atom, a cyano group, an unsubstituted or substituted straight-chain or branched alkyl group, an unsubstituted or substituted alkoxyl group, a carboxyl acid ester group, an unsubstituted or substituted aryl group, an unsubstituted or substituted aryloxy group, an unsubstituted or substituted alkylthio group, an unsubstituted or substituted arylthio group, an unsubstituted or substituted benzyl group, an unsubstituted or substituted benzyloxy group, an unsubstituted or substituted benzylthio group or a heterocyclic group.

20. The optical information recording medium as claimed in claim 19, wherein said recording layer further comprises at least one organic dye having a maximum absorption wavelength in the range of 680 nm to 750 nm.

21. The optical information recording medium as claimed in claim 20, wherein said organic dye having a maximum absorption wavelength in the range of 680 nm to 750 nm is selected from the group consisting of a cyanine dye, a phthalocyanine dye and an azo metal chelate dye.

22. The optical information recording medium as claimed in claim 19, wherein said recording layer is capable of recording information with the application of a laser beam with a wavelength of 630 nm to 720 nm thereto.

23. The optical recording medium as claimed in claim 19, further comprising an undercoat layer between said substrate and said recording layer.

24. The optical information recording medium as claimed in claim 19, further comprising a reflection layer on said recording layer.

25. The optical information recording medium as claimed in claim 24, further comprising a protective layer on said reflection layer.

26. The optical information recording medium as claimed in claim 24, wherein said reflection layer comprises a material selected from the group consisting of aluminum and gold.

27. The optical information recording medium as claimed in claim 19, further comprising a protective layer on said recording layer.

28. The optical information recording medium as claimed in claim 27, wherein said protective layer comprises an ultraviolet-curing resin.

* * * * *

UNITED STATES PATENT AND TRADEMARK OFFICE
CERTIFICATE OF CORRECTION

PATENT NO. : 5,998,093

DATED : December 7, 1999

INVENTOR(S): Tatsuya TOMURA, et al.

It is certified that an error appears in the above-identified patent and that said Letters Patent is hereby corrected as shown below:

Column 34, Comp. No. 67, under column M, "Si(OCOC$_7$H$_{25}$)$_2$" should read --Si(OCOC$_7$H$_{15}$)$_2$--.

Column 36, Comp. No. 90, under column X$^1$, "C$_6$H$_{33}$" should read --C$_6$H$_{13}$--.

Column 38, Comp. No. 110, under column X$^1$, "C$_7$H$_{25}$" should read --C$_7$H$_{15}$--.

Column 40, Comp. No. 138, under column X$^6$, "Br" should read --*X$^5$--.

Column 66, line 14, "rosin" should read --resin--.

Column 81, line 27, "1000 $\mu$," should read --1000 Å,--.

Column 88, line 35, "5 km" should read --5 $\mu$m--.

Column 90, line 53, "Ga, Ti, Mn," should read --Ga, Tl, Mn,--.

Signed and Sealed this

First Day of May, 2001

Attest:

NICHOLAS P. GODICI

*Attesting Officer*    *Acting Director of the United States Patent and Trademark Office*